(12) United States Patent
Walsh

(10) Patent No.: US 12,083,893 B1
(45) Date of Patent: Sep. 10, 2024

(54) TORQUE TRANSMISSION SYSTEM

(71) Applicant: Anthony Gregory Walsh, Victoria (CA)

(72) Inventor: Anthony Gregory Walsh, Victoria (CA)

( * ) Notice: Subject to any disclaimer, the term of this patent is extended or adjusted under 35 U.S.C. 154(b) by 295 days.

(21) Appl. No.: 17/555,806

(22) Filed: Dec. 20, 2021

(51) Int. Cl.
*B60K 6/365* (2007.10)
*F16H 3/66* (2006.01)

(52) U.S. Cl.
CPC ............... *B60K 6/365* (2013.01); *F16H 3/66* (2013.01); *F16H 2200/2002* (2013.01)

(58) Field of Classification Search
CPC ... B60K 6/365; F16H 3/66; F16H 2200/2002; F16H 2200/2005; F16H 3/54; F16H 2200/2041; F16H 2003/008; F16H 3/24
See application file for complete search history.

(56) References Cited

U.S. PATENT DOCUMENTS

| | | | | |
|---|---|---|---|---|
| 2004/0180752 A1* | 9/2004 | Haka | ..................... | F16H 3/54 475/303 |
| 2021/0146775 A1* | 5/2021 | Zalewski | ................. | F16H 3/54 |
| 2021/0207568 A1* | 7/2021 | Hemphill | ............. | F02N 15/046 |
| 2023/0022828 A1* | 1/2023 | Kim | ........................ | B60K 6/36 |

FOREIGN PATENT DOCUMENTS

DE 102020203787 A1 * 9/2021

* cited by examiner

*Primary Examiner* — Stacey A Fluhart
*Assistant Examiner* — Aimee Tran Nguyen
(74) *Attorney, Agent, or Firm* — Michael D. Eisenberg

(57) ABSTRACT

An output mechanism for use in a transmission includes an output shaft, a sun gear assembly, a planetary assembly, an outer gear, and an output gear. The sun gear assembly includes: a sun gear around the output shaft and a sun gear sleeve extending from the sun gear. The planetary assembly includes: one or more planetary gears around and meshed with the sun gear; and a casing surrounding the sun gear, joined to the one or more planetary gears, and configured to rotate around the sun gear when the one or more planetary gears rotate around the sun gear. The outer gear has inner teeth meshed with the one or more planetary gears and outer teeth being configured to be selectively meshed with a first external gear. The output gear is rotatably locked to the sun gear sleeve and is configured to be selectively meshed with a second external gear.

20 Claims, 14 Drawing Sheets

TORQUE TRANSMISSION SYSTEM

TECHNICAL FIELD

The present application, in some embodiments thereof, relates to drive apparatuses and transmission systems, to control the torque transfer from a motor to other components of a machine, such as one or more wheels of a motor vehicle.

BACKGROUND

A transmission is a machine in a power transmission system, which provides controlled application of power. The term transmission properly refers to the whole drivetrain, including clutch, gearbox, prop shaft (for rear-wheel drive vehicles), differential, and final drive shafts.

The most common use is in motor vehicles, where the transmission adapts the output of the internal combustion engine to the drive wheels. Such engines need to operate at a relatively high rotational speed, which is inappropriate for starting, stopping, and slower travel. The transmission reduces the higher engine speed to the slower wheel speed, increasing torque in the process.

Often, a transmission has multiple gear ratios (or simply "gears") with the ability to switch between them as the speed varies. This switching may be done manually (by the operator) or automatically (by a control unit). Directional (forward and reverse) control may also be provided.

BRIEF SUMMARY OF THE INVENTION

An aim of the system of the present invention is to provide a three-gear transmission for a motor vehicle.

Therefore, an aspect of some embodiments of the present invention relates to a transmission system, comprising and input mechanism, a transmission mechanism, and an output mechanism. The input mechanism includes and input shaft and an input gear. The input shaft is configured to be joined to an engine and configured to be rotated by the engine about a central longitudinal axis of the input shaft. The input gear is disposed on the input shaft and rotating with the input shaft. The transmission mechanism include a transmission shaft, a main transmission gear, a first slidable gear, and a second slidable gear. The main transmission gear is disposed on the transmission shaft and rotates with the transmission shaft, and is meshed with the input gear to transfer torque from the input shaft to the transmission shaft. The first slidable gear is disposed on the transmission shaft, and configured to be slid along the transmission shaft and to rotate with the transmission shaft when located at a first position along the transmission shaft. The second slidable gear disposed on the transmission shaft, and configured to be slid along the transmission shaft and to rotate with the transmission shaft when located at a second along the transmission shaft. The output mechanism includes an output shaft parallel to the transmission shaft, a sun gear assembly, a planetary gear assembly, an outer gear, and an output gear. The sun gear assembly includes: (i) a sun gear traversed by the output shaft and concentric with the output shaft; (ii) a first bushing disposed between the sun gear and the output shaft and configured to enable relative rotation between the sun gear and the output shaft; and (iii) a sun gear sleeve extending from the sun gear and traversed by the output shaft, the sun gear sleeve rotating with the sun gear. The planetary gear assembly includes: (i) one or more planetary gears disposed around an outer circumference of the sun gear and meshed with the sun gear; and (ii) a casing concentric to the sun gear, not touching the sun gear, and joined to centers of the one or more planetary gears, such that the casing is configured to rotate around the sun gear due to motion of the one or more planetary gears around the sun gear, the casing being mounted on the output shaft. The outer gear is concentric with the casing, and has inner teeth and outer teeth, the inner teeth being meshed with the one or more planetary gears and the outer teeth of the outer gear being configured to be meshed with the first slidable gear when the first slidable gear is at the first position, to receive torque from the transmission shaft when the first slidable gear is aligned with the outer gear. The output gear is disposed at a fixed position on the sun gear sleeve and is lockingly joined to the sun gear sleeve to rotate with the sun gear sleeve, the output gear being configured to be meshed with the second slidable gear when the second slidable gear is at the second position, to receive torque from the transmission shaft when the second slidable gear is aligned with the output gear.

In a variant, the first bushing extends longitudinally from the sun gear at least partially through the sun gear sleeve, to mount the sun gear sleeve onto the output shaft and to enable relative rotation between the sun gear sleeve and the output shaft.

In another variant, the transmission system includes a further bushing between the output shaft and at least a portion of the sun gear sleeve, to mount the sun gear sleeve onto the output shaft and to enable relative rotation between the sun gear sleeve and the output shaft.

In yet another variant, the transmission system comprises a differential and the casing is mounted on the output shaft via a second bushing. The differential includes a proximal gear, a central gear, and a distal gear. The proximal gear is rotationally locked with the casing and rotates with the casing, the proximal gear being rotationally locked with the output shaft and configured to rotate the output shaft. The central gear is meshed with the proximal gear. The distal gear is meshed with the central gear and is configured to be joined to and to rotate with a second output shaft.

In a further variant, the casing is locked with the output shaft, such that rotation of the casing causes rotation of the output shaft.

In yet a further variant, the transmission system includes a first locking unit and a second locking unit. The first locking unit is disposed on the transmission shaft and is configured to lock the first slidable gear with the transmission shaft at the first position aligned with the outer gear, such that the first slidable gear rotates with the transmission shaft when located at the first position, in order to transmit torque from the transmission shaft to the outer gear. The second locking unit is disposed on the transmission shaft and is configured to lock the second slidable gear with the transmission shaft at the second position aligned with the output gear, such that the second slidable gear rotates with the transmission shaft when located at the second position, in order to transmit torque from the transmission shaft to the output gear.

In a variant, a neutral mode in which torque is not transmitted from the input shaft to the output shaft is achieved, when: the first slidable gear is not aligned with the outer gear; and the second slidable gear is not aligned with the output gear.

In another variant, the transmission system includes a brake, and a low gear is achieved when: the second slidable gear is meshed with the output gear and transmits torque from the transmission shaft to the sun gear sleeve via the output gear; the first slidable gear is not meshed with the outer gear; and the brake is applied to the outer gear to prevent rotation of the outer gear.

In yet another variant, the transmission system includes a brake, and an intermediate gear is achieved when: the first slidable gear is meshed with the outer gear and transmits torque from the transmission shaft to the outer gear; the second slidable gear is not meshed with the output gear; and the brake is applied to the output gear to prevent rotation of the sun gear sleeve and of the sun gear.

In a further variant, a high gear is achieved, when: the first slidable gear is meshed with the outer gear and transmits torque from the transmission shaft to the outer gear, and the second slidable gear is meshed with the output gear and transmits torque from the transmission shaft to the sun gear sleeve via the output gear.

In yet a further variant, the one or more planetary gears comprise a plurality of planetary gears.

Another aspect of some embodiments of the present invention relates to an output mechanism for use in a transmission system. The output mechanism includes an output shaft, a sun gear assembly, a planetary gear assembly, an outer gear, and an output gear. The sun gear assembly comprises: (i) a sun gear traversed by the output shaft and concentric with the output shaft; (ii) a first bushing disposed between the sun gear and the output shaft and configured to enable relative rotation between the sun gear and the output shaft; and (iii) a sun gear sleeve extending from the sun gear and traversed by the output shaft, the sun gear sleeve rotating with the sun gear. The planetary gear assembly comprises: (i) one or more planetary gears disposed around an outer circumference of the sun gear and meshed with the sun gear; and (ii) a casing concentric to the sun gear, not touching the sun gear, and joined to centers of the one or more planetary gears, such that the casing is configured to rotate around the sun gear due to motion of the one or more planetary gears around the sun gear, the casing being mounted on the output shaft. The outer gear is concentric with the casing, the outer gear having inner teeth and outer teeth, the inner teeth being meshed with the one or more planetary gears and the outer teeth of the outer gear being configured to be selectively meshed with a first external gear, to selectively receive torque from the first external gear. The output gear is disposed at a fixed position on the sun gear sleeve and lockingly joined to the sun gear sleeve to rotate with the sun gear sleeve, the output gear being configured to be selectively meshed with a second external gear, to selectively receive torque from the second external gear.

In a variant, the first bushing extends longitudinally from the sun gear at least partially through the sun gear sleeve, to mount the sun gear sleeve onto the output shaft and to enable relative rotation between the sun gear sleeve and the output shaft.

In another variant, the output mechanism includes a further bushing between the output shaft and at least a portion of the sun gear sleeve, to mount the sun gear sleeve onto the output shaft and to enable relative rotation between the sun gear sleeve and the output shaft.

In yet another variant, the output mechanism includes a differential and the casing is joined to the output shaft via a second friction reducing bushing. The differential comprises a proximal gear, a central gear, and a distal gear. The proximal gear is rotationally locked the casing and rotates with the casing, the proximal gear being rotationally locked with the output shaft and configured to rotate the output shaft. The central gear is meshed with the proximal gear. The distal gear is meshed with the central gear and is configured to be joined to and to rotate with a second output shaft.

In a further variant, the casing is locked with the output shaft, such that rotation of the casing causes rotation of the shaft.

In a variant, a neutral mode in which torque is not transmitted from the external gears to the output shaft is achieved, when the first external gear is not meshed with the outer gear and the second external gear is not meshed with the output gear.

In another variant, the output mechanism comprises a brake, and a low gear is achieved, when: the second external gear is meshed with the output gear and transmits torque to the sun gear sleeve via the output gear; the first external gear is not meshed with the outer gear; and the brake is applied to the outer gear to prevent rotation of the outer gear.

In yet another variant, the output mechanism comprises a brake, and an intermediate gear is achieved, when: the first external gear is meshed with the outer gear and transmits torque to the outer gear; the second external gear is not meshed with the output gear; and the brake is applied to the output gear to prevent rotation of the sun gear sleeve and of the sun gear.

In yet another variant, a high gear is achieved, when the first external gear is meshed with the outer gear and transmits torque to the outer gear, and the second external gear is meshed with the output gear and transmits torque to the sun gear sleeve via the output gear.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

Figure 1A:
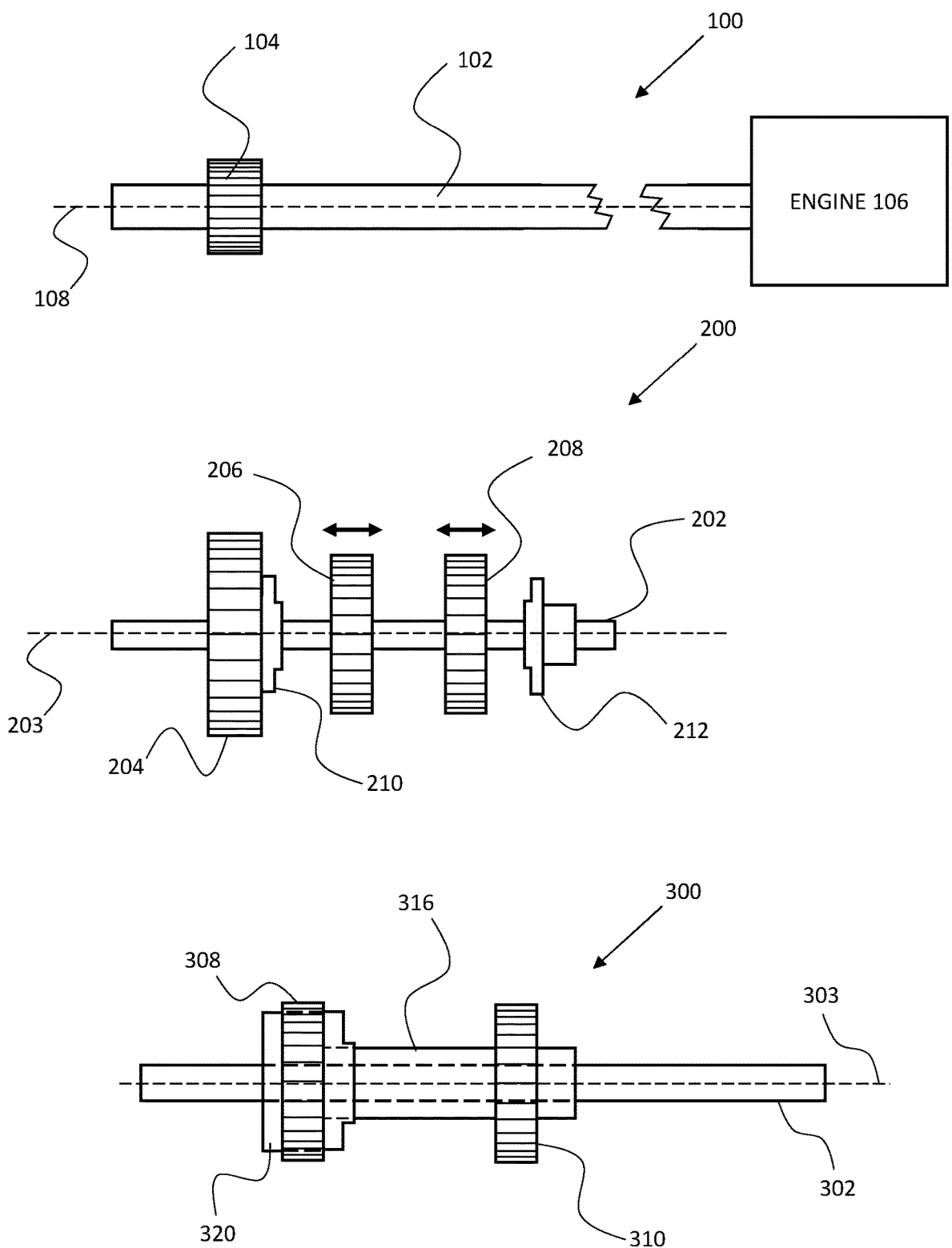
FIGS. 1a and 1b show the three elements of the transmission system of the present invention.
Figure 1B:
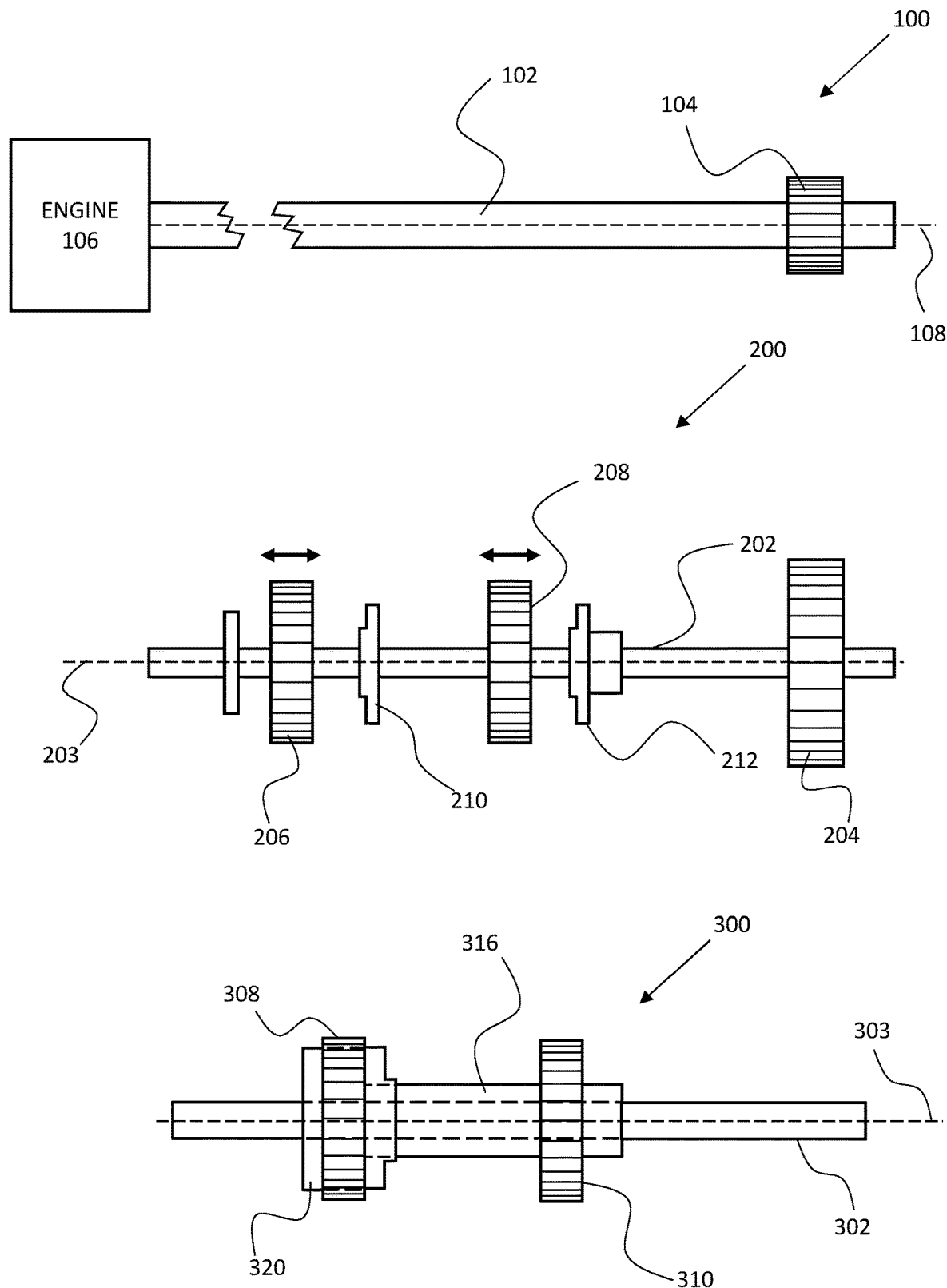

Referring now to the figures, FIGS. 1a and 1b show the three elements of the transmission system of the present invention. The transmission system includes an input apparatus 100, a transmission apparatus 200, and an output apparatus 300.

The input apparatus 100 includes an input shaft 102 and an input gear 104. The input shaft 102 is configured to be rotated by the engine 106 about a first central longitudinal axis 108 of the input shaft. The input shaft 102 may be joined to the engine 106 via a clutch mechanism, to selectively engage and disengage power transmission from the engine 106 to the input shaft 102. The input gear 104 is disposed on the input shaft 102 and is radially concentric with the input shaft 102. The input gear 104 rotates with the input shaft 102 around the first central longitudinal axis 108.

The transmission apparatus 200 includes a transmission shaft 202, a main transmission gear 204, a first slidable gear 206, and a second slidable gear 208. The transmission shaft 202 extends along a second central longitudinal axis 203, which may or may not be parallel to the input shaft 102. The main transmission gear 204 is disposed on the transmission shaft 202 and is radially concentric with the transmission shaft 202. The main transmission gear 204 rotates with the transmission shaft 202 about the second central longitudinal axis 203. The main transmission gear 204 is meshed with the input gear 102 to transfer torque from the input shaft 102 to the transmission shaft 202, as shown in FIG. 9-12. Thus, rotation of the input shaft 102 around the first central axis 108 causes the rotation of the transmission shaft 202 around the second central longitudinal axis 203.

The first slidable gear 206 is disposed on the transmission shaft 202, is radially concentric to the transmission shaft 202, and is configured to be slid along the transmission shaft 202. A first locking unit 210 is disposed on the transmission shaft 202 to releasably lock the first slidable gear 206 at a first position along the transmission shaft 202 and prevent sliding when locked. When the first slidable gear 208 is locked with the transmission shaft 202, the first slidable gear rotates with the transmission shaft 202 about the central longitudinal axis 203.

The second slidable gear 208 is disposed on the transmission shaft 202, is radially concentric to the transmission shaft 202, and is configured to be slid along the transmission shaft 202. A second locking unit 212 is disposed on the transmission shaft 202 to releasably lock the second slidable gear 208 at a second position along the transmission shaft 202 and prevent sliding when locked. When the second slidable gear 208 is locked with the transmission shaft 202, the second slidable gear 208 rotates with the transmission shaft 202 about the central longitudinal axis 203.

Figure 2:
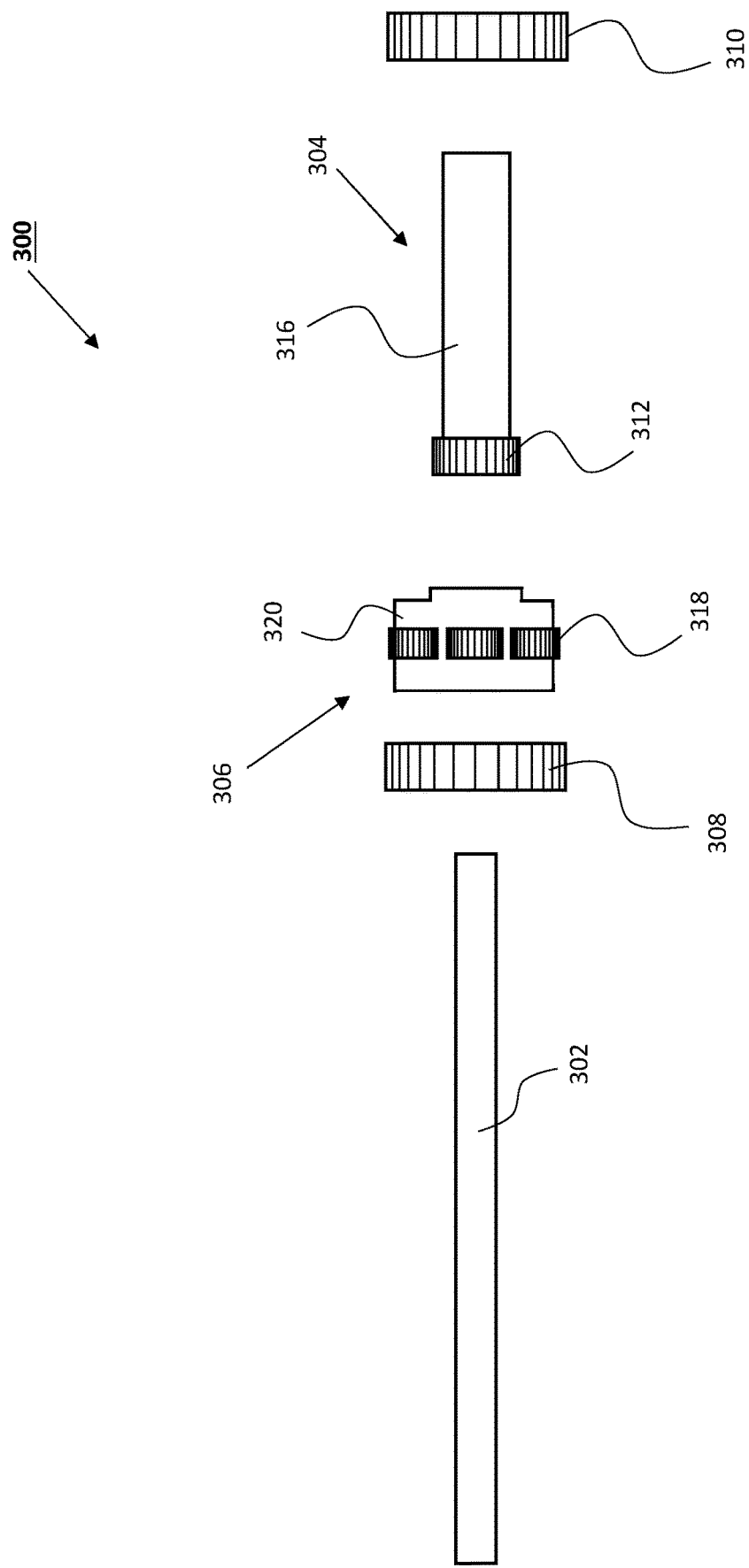
FIG. 2 is an exploded side view of the output apparatus of the transmission system, according to some embodiments of the present invention.
Figure 3A:
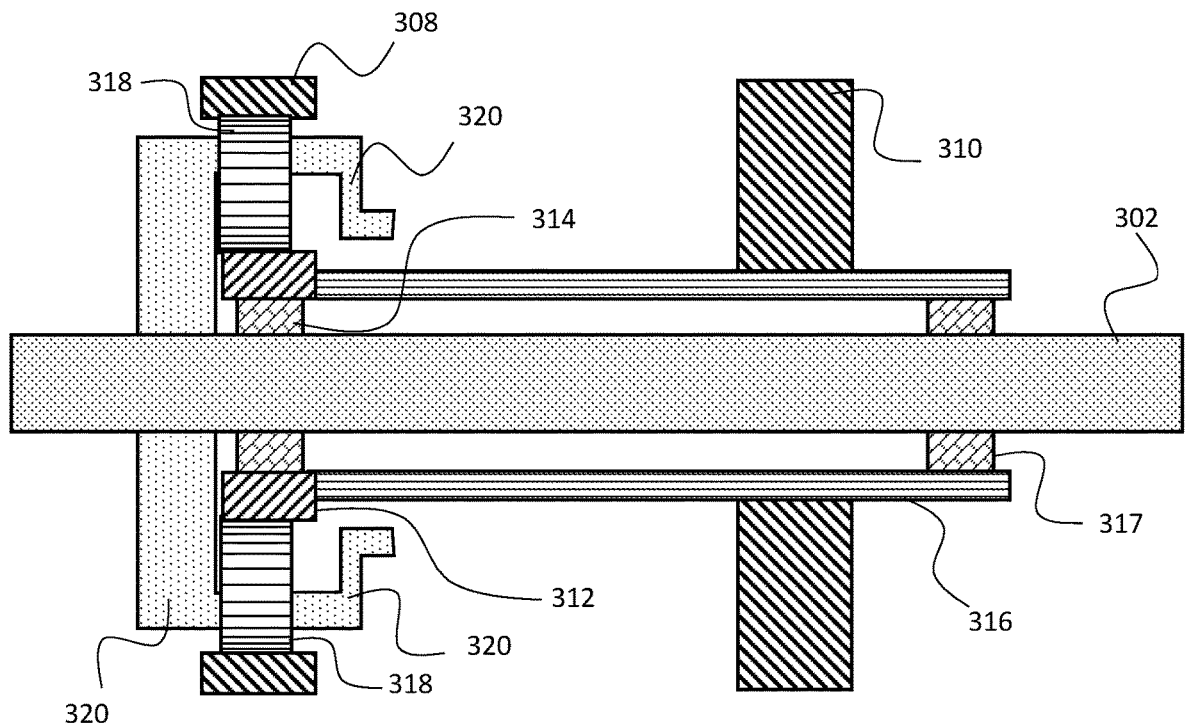
FIGS. 3a and 3b are side cross-sectional view of the output apparatus, in which the planetary casing is joined to the output shaft so as to rotate with the output shaft, according to some embodiments of the present invention.
Figure 3B:
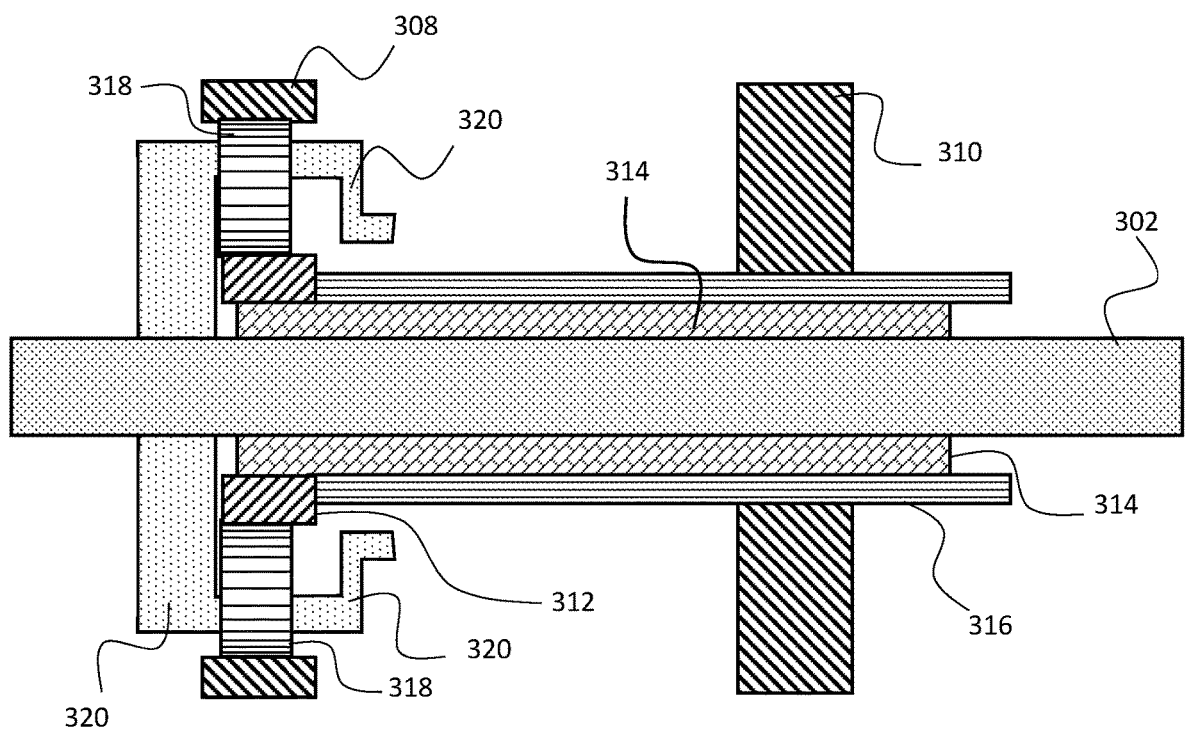
Figure 4A:
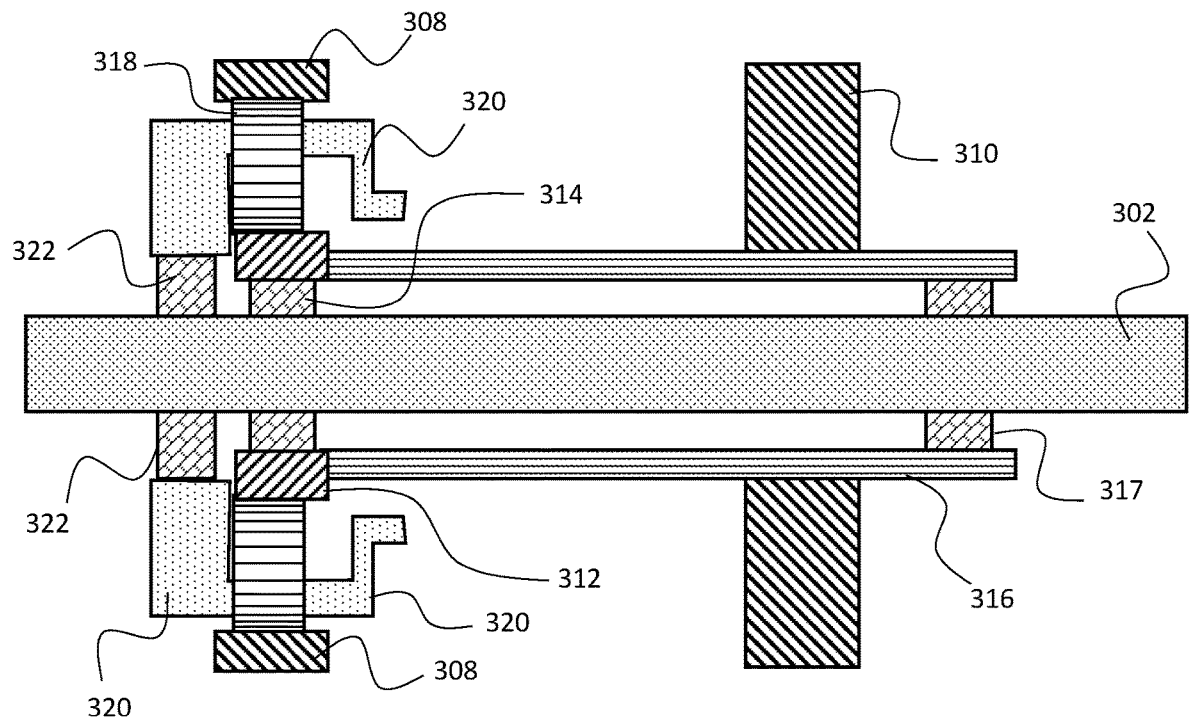
FIGS. 4a and 4b are side cross-sectional view of the output apparatus, in which the planetary casing is joined to the output shaft via a bushing, so as to decrease friction between the bushing and the output shaft, according to some embodiments of the present invention.
Figure 4B:
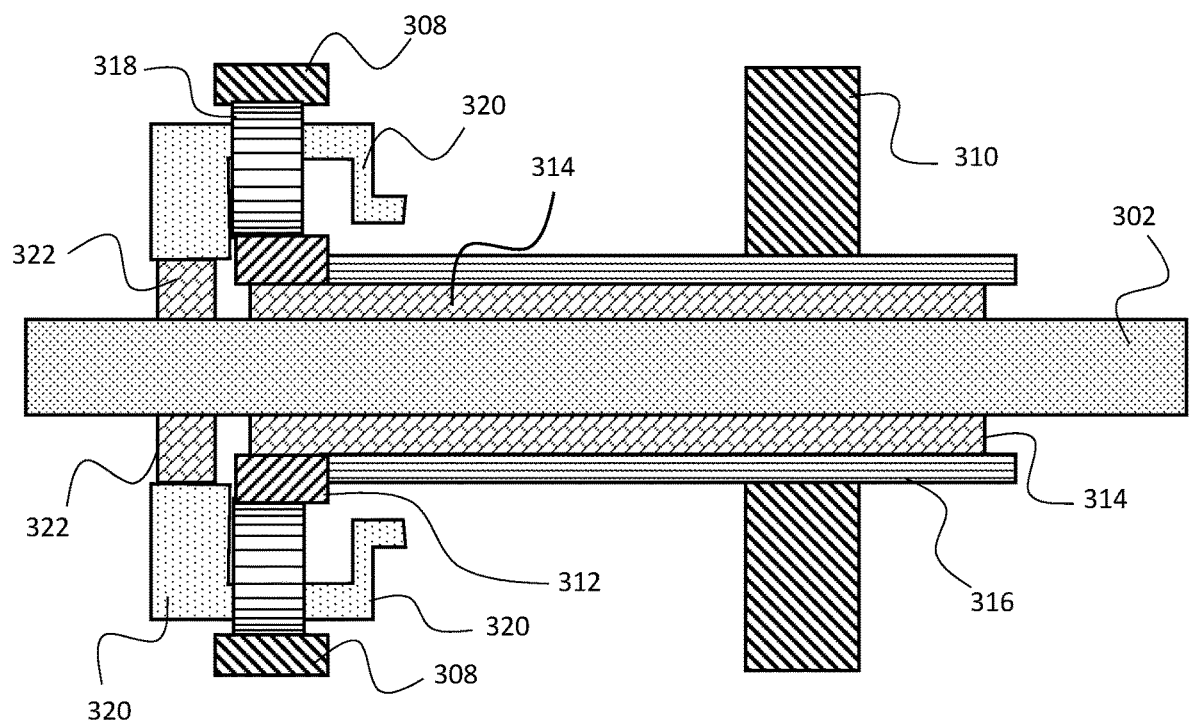
Figure 5:
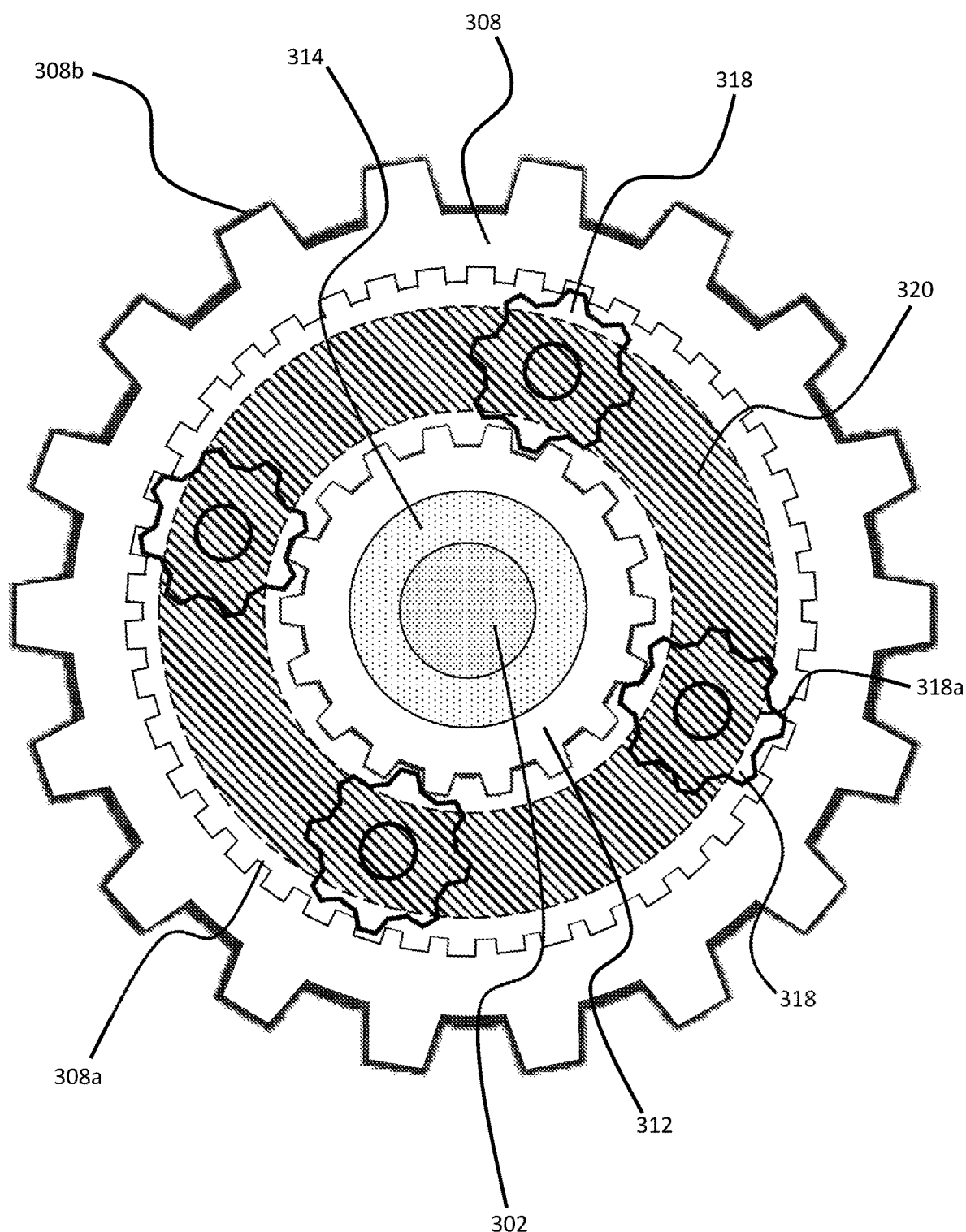
FIG. 5 is a cross-sectional front view of the outer gear, planetary gears, planetary casing, and sun gear in the output apparatus, according to some embodiments of the present invention.

FIG. 2 is an exploded side view of the output apparatus of the transmission system, according to some embodiments of the present invention. FIGS. 3a and 3b are side cross-sectional views of the output apparatus, in which the planetary casing is joined to the output shaft so as to rotate with the output shaft, according to some embodiments of the present invention. FIGS. 4a-4b are side cross-sectional view of the output apparatus, in which the planetary casing is joined to the output shaft via a bushing, so as to decrease friction between the planetary casing and the output shaft, according to some embodiments of the present invention. FIG. 5 is a cross-sectional front view of the outer gear, planetary gears, planetary casing, and sun gear in the output apparatus, according to some embodiments of the present invention.

Referring to FIGS. 1a, 1b, and 2-5, the output mechanism 300 includes an output shaft 302, a sun gear assembly 304, a planetary gear assembly 306, an outer gear 308, and an output gear 310.

The output shaft 302 extends along a third central longitudinal axis 303, and is parallel to the transmission shaft 202.

The sun gear assembly 304 includes a sun gear 312, a first bushing 314, and a sun gear sleeve 316. The sun gear assembly 304 is mounted on the output shaft 302 in a manner to allow relative rotation between the sun gear assembly 304 and the output shaft 302.

The sun gear 312 is traversed by the output shaft 302 and is radially concentric with the output shaft 302. The sun gear 312 is configured to rotate about the output shaft 302. The first bushing 314 is disposed between the sun gear 312 and the output shaft 302 and is configured to allow relative rotation between the sun gear 312 and the output shaft 302.

The sun gear sleeve 316 extends from the sun gear 308 parallel to the output shaft 302 and is traversed by the output shaft 302. The sun gear sleeve 316 is locked with or integral with the sun gear 302 and rotates with the sun gear 302. In some embodiments of the present invention, as seen in FIGS. 3*b* and 4*b*, a second bushing 317 is disposed between the sun gear sleeve 316 and output shaft 302 in order to mount the sun gear sleeve 316 on the output shaft 302 while allowing relative rotation between the sun gear sleeve 316 on the output shaft 302. In some embodiments of the present invention, as seen in FIGS. 3*a* and 4*a*, the second bushing is not present. Rather, the first bushing 314 extends longitudinally within the sun gear 302 and at least partially within the sun gear sleeve 316.

The planetary gear assembly 306 includes one or more planetary gears 318 and a casing (or planetary casing) 320. The one or more planetary gears are disposed around an outer circumference of the sun gear 312 and are meshed with the sun gear 312. The casing 320 is radially concentric to the sun gear 312, does not touch the sun gear 312. The centers 318*a* of the planetary gears 318 are joined to the casing 320, such that the planetary gears 318 can rotate about their centers 318*a*. In this manner, the casing 320 is configured to rotate around the sun gear 312 due to relative motion between the sun gear 312 and the planetary gears 318.

The casing 320 is mounted on the output shaft 302 in one of two manners: (a) lockingly, such that the rotation of the casing 320 about the third central axis 303 caused the output shaft 302 to rotate about the third central axis 303, as seen in FIGS. 3*a*-3*b*; or (b) via a friction reducing bushing 322, as seen in FIGS. 4*a*-4*b*. As will be explained further below, the embodiment with the bushing 322 may be used in conjunction with a differential and a second output shaft, so that the output shaft 302 is connected to a first wheel while the second output shaft is connected to a second wheel, with the differential transmitting torque to both wheels from the casing 302, while allowing some slack between the wheels.

The outer gear 308 is radially concentric to the sun gear 312 and the casing 320. The outer gear 308 has inner teeth 308*a* and outer teeth 308*b*. The inner teeth 308*a* are meshed with the planetary gears 318, while the outer teeth 308*b* are configured to be meshed with the first slidable gear 206 to receive torque from the transmission shaft 202 when the first slidable gear 206 is aligned with the outer gear 308.

The output gear 310 is lockingly joined to the sun gear sleeve 316 at a fixed position on the sun gear sleeve and is configured to rotate with the sun gear sleeve 316. The output gear 310 is configured to be meshed with the second slidable gear 208 to receive torque from the transmission shaft 202 when the second slidable gear 208 is aligned with the output gear 310.

In the example of FIG. 1*a*, the first slidable gear 206 and the second slidable gear 208 are located between the first locking unit 210 and the second locking unit 212. In the example of FIG. 1*b*, the second slidable gear 208 is between the first locking unit 210 and the second locking unit 212, while the first slidable gear 206 is beyond the first locking unit 210, such that the first locking unit 210 is between the first slidable gear 206 and the second slidable gear 208. In the example of FIG. 1*a*, the first locking unit 210 is between the main transmission unit 204 and the first slidable unit 206, while in the example of FIG. 1*b*, the second locking unit 212 is between the main transmission unit 204 and the second slidable unit 208. It should be understood that the relative positions of the elements of the transmission apparatus 200 and the output apparatus 300 can change and that different configurations are within the scope of the present invention, as long as: (1) the input gear 104 is meshed with the main transmission gear 204; (2) when the first slidable gear 206 is locked into the first position by the first locking unit 210, the first slidable gear is aligned with and meshed with the outer gear 308; and (3) when the second slidable gear 208 is locked into the second position by the second locking unit 212, the first slidable gear is aligned with and meshed with the output gear 310. It is also appreciated that the input shaft 102 and the transmission shaft 202 need not be parallel with each other, as the input gear 104 and the main transmission gear 204 may include any type of gear which mesh together at a desired angle, such as spur gears, helical gears, bevel gears, worm gears, hypoid gears, for example. A person skilled in the art can use gears of choice and a corresponding angle between the input shaft 102 and the transmission shaft 202 to adapt the transmission system of the present invention according to a desired requirement.

It should be noted that while in FIG. 5 four planetary gears 318 are shown, the scope of the present invention extends to any number of planetary gears. The transmission system of the present invention may include a single planetary gear. In some embodiments of the present invention, the number of planetary gears 318 is, two, three, four, or more. Using a plurality (two or more) of planetary gears 318 increases the strength of the output mechanism 300. A person of skill in the art will be able to select the number of planetary gears according to specific requirements without departing from the scope of the present invention.

Figure 6:
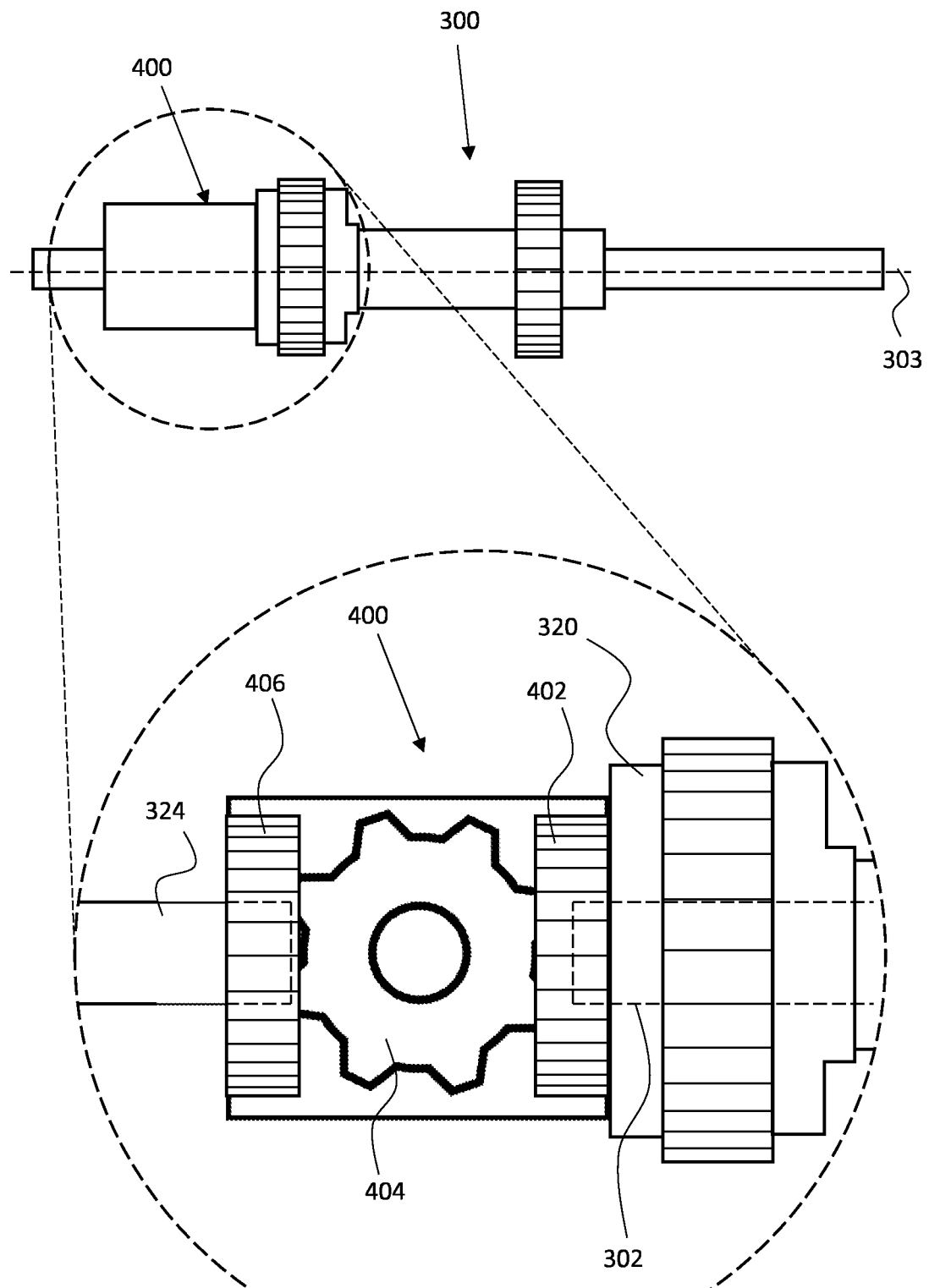
FIG. 6 is a side view of the output apparatus connected to differential, according to some embodiments of the present invention.
Figure 7:
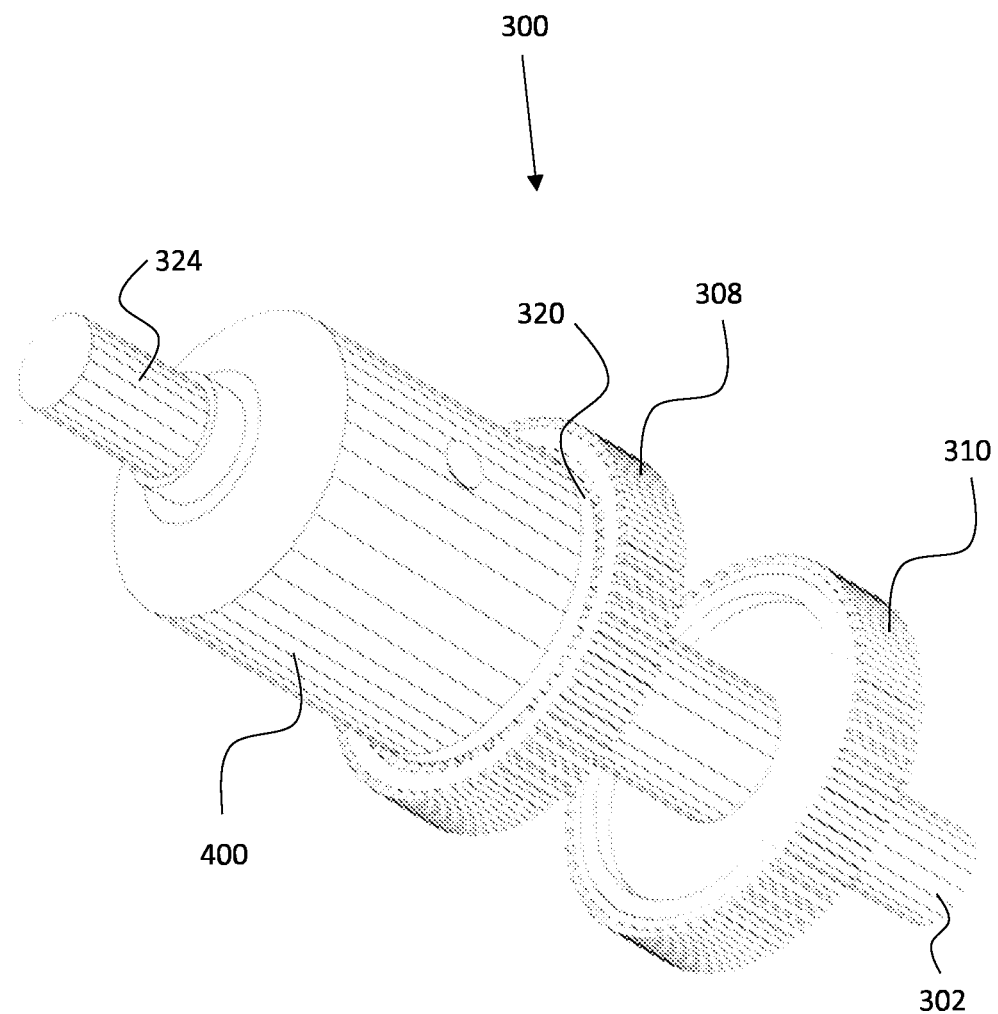
FIG. 7 is a perspective view of the output apparatus connected to a differential, according to some embodiments of the present invention.
Figure 8:
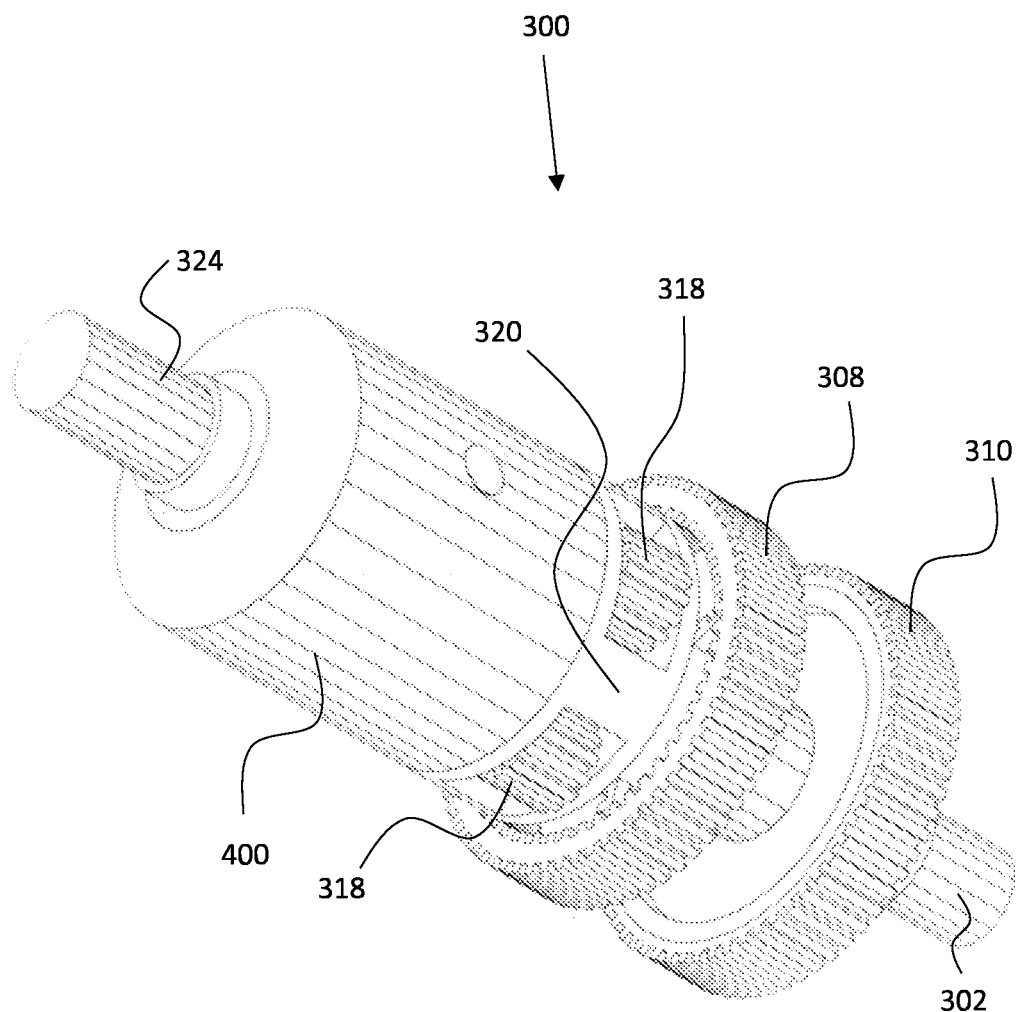
FIG. 8 is a perspective view of the output apparatus connected to a differential, with the outer gear pulled away to show some planetary gears and the planetary casing, according to some embodiments of the present invention.

FIG. 6 is a side view of the output apparatus connected to differential, according to some embodiments of the present invention. FIG. 7 is a perspective view of the output apparatus connected to a differential, according to some embodiments of the present invention. FIG. 8 is a perspective view of the output apparatus connected to a differential, with the outer gear pulled away to show some planetary gears and the planetary casing, according to some embodiments of the present invention.

FIGS. 6-8 relate to the embodiment of FIGS. 4*a*-4*b*, in which the casing 320 is mounted on the output shaft 320 via a bushing 322 configured to enable relative rotation between the casing 320 and the output shaft 302.

The transmission system includes a differential 400, which includes a proximal gear 402, a central gear 404, and distal gear 406. The proximal gear 402 is pressed against or otherwise rotationally locked with the casing 320, such that rotation of the casing 320 causes the proximal gear 402 to rotate. The proximal gear 402 is locked with the output shaft 302 and configured to rotate the output shaft 302. Thus, the proximal gear 402 transfers torque from the casing 320 to the output shaft 302, such that rotation of the casing 320 causes the output shaft 302 to rotate.

Figure 15:
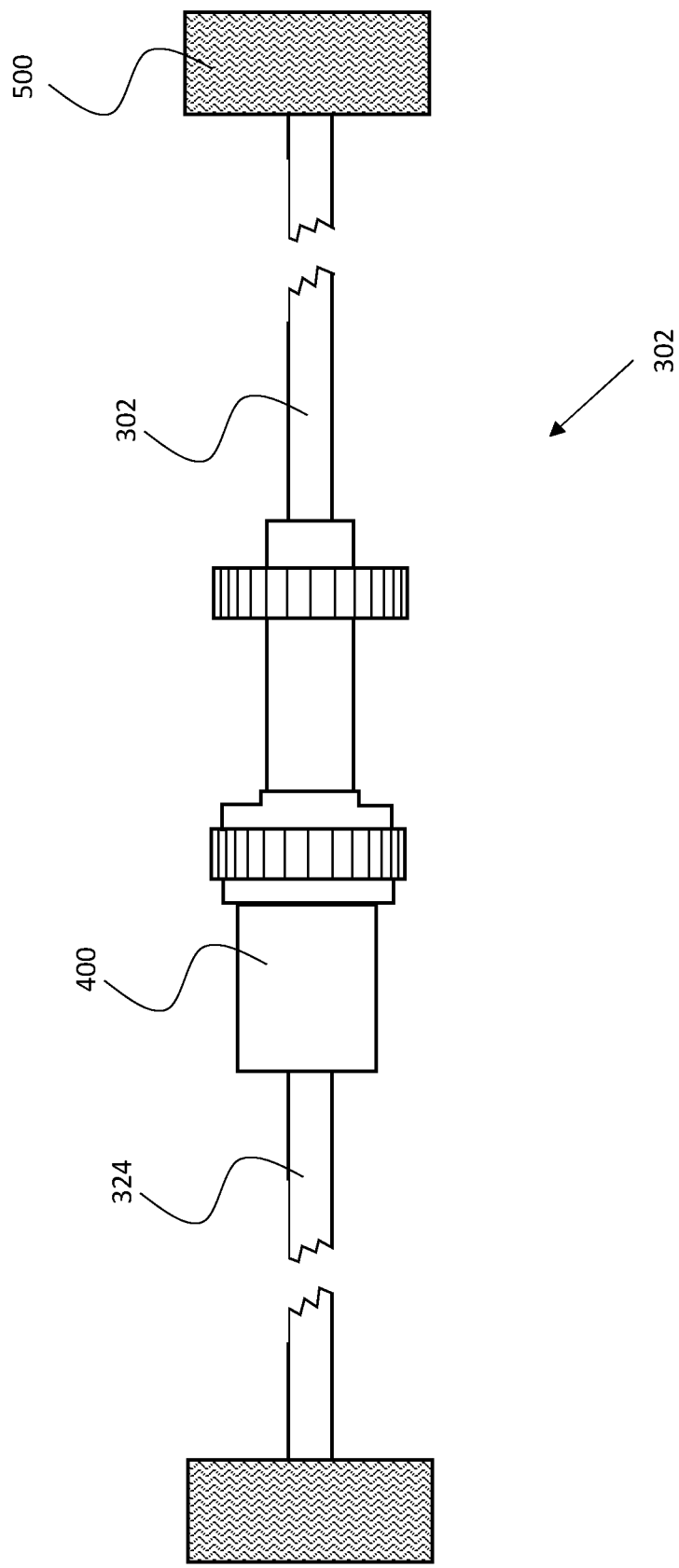
FIG. 15 illustrates the output mechanism of FIGS. 4a-4b used in a motor vehicle to power the motor vehicle, wherein the output shaft and second output shaft are connected directly to respective wheels of the motor vehicle, according to some embodiments of the present invention.

The central gear 404 is meshed with the proximal gear 402. The central gear 404 is optionally perpendicular to the proximal gear 402. The distal gear 406 is meshed with the central gear 402 and configured to be joined to and to rotate with a second output shaft 324. In some embodiments of the present invention, the distal gear 406 is parallel to the proximal gear 402, and the second output shaft 324 is parallel to the output shaft 302, and both output shafts 302 and 324 extend along the third central axis 303. In this manner, the output shaft 302 and the second output shaft 304 may rotate at different speeds or at the same speed according to the need. This may be useful, for example, when the transmission system of the present invention is used in a motor vehicle, and a first wheel 500 is joined to and radially concentric with the first output shaft 302, while a second wheel 502 is joined to and radially concentric with the second output shaft 324, as shown in FIG. 15. If both wheels rotate at the same speed (for example, while the vehicle moves on a straight line), the proximal gear 402 and the distal gear 406 rotate together, while the central gear 404 does not rotate about its axis. If the wheels 500 and 502 rotate at different speeds (for example, when the vehicle travels on a curved path), the proximal gear 402 and the distal gear 406 rotate at different speeds, and the central gear 404 also rotates about its own axis to compensate for the difference between the rotation speeds of the proximal gear 404 and the distal gear 406. The use of differentials to enable slack between wheels is known in the art.

Figure 9:
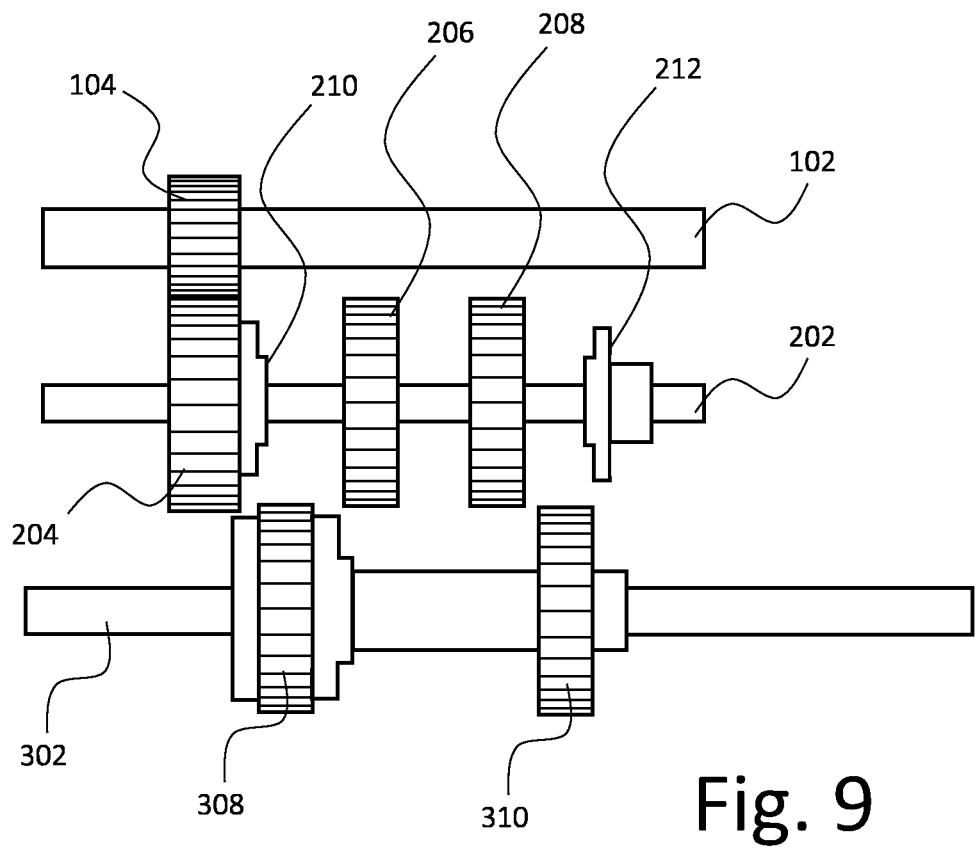
FIG. 9 illustrates the transmission system in a neutral gear, according to some embodiments of the present invention.

FIG. 9 illustrates the transmission system in a neutral gear mode, according to some embodiments of the present invention.

In the neutral gear mode, no torque is transmitted from the input shaft 102 to the output shaft 302. The first slidable gear 206 is not locked by the first locking unit 210 in the first position and is therefore not aligned with the outer gear 308. The second slidable gear 208 is not locked by the second locking unit 212 in the second position and is therefore not aligned with the output gear 310.

Therefore, the rotation of the input shaft 102 causes the transmission shaft 202 to rotate because of the meshing of the input gear 104 and the main transmission gear 204. However, since the first slidable gear 206 is neither aligned with nor meshed with the outer gear 308 and because the second slidable gear 208 is neither aligned with nor meshed with the output gear 310, no torque is transferred from the transmission shaft 202 to the output shaft 302.

Figure 10:
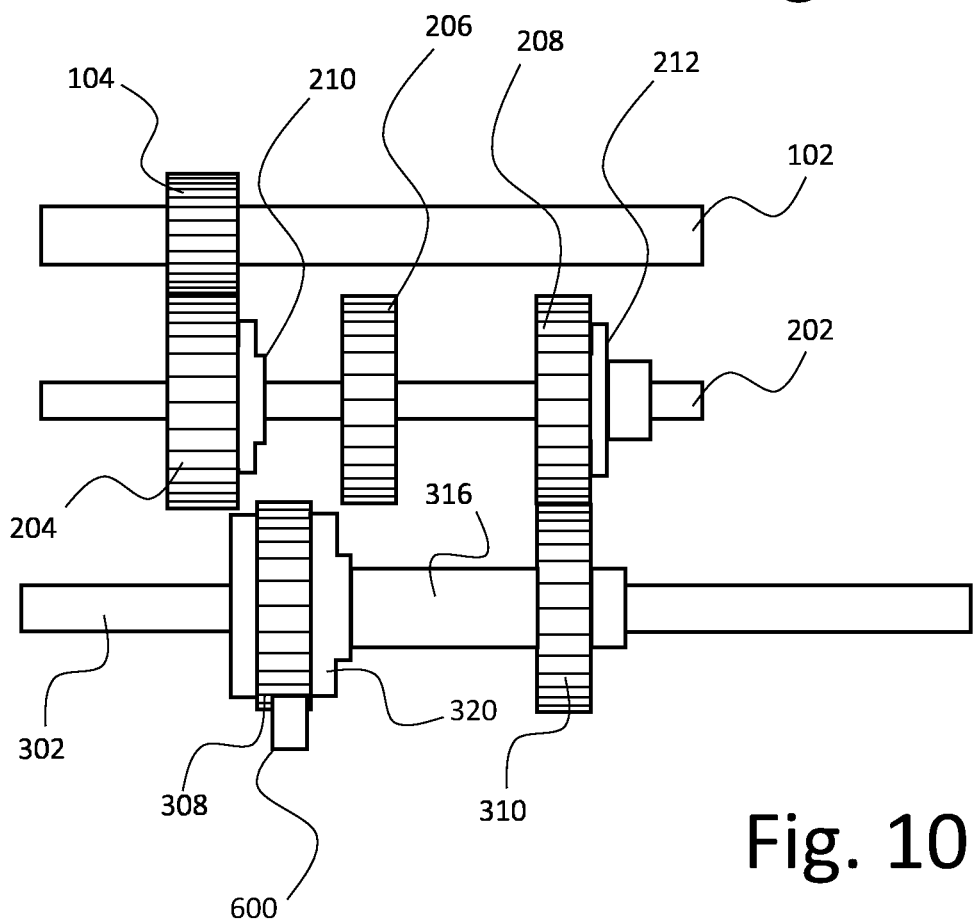
FIG. 10 illustrates the transmission system in a low gear, according to some embodiments of the present invention.

FIG. 10 illustrates the transmission system in a low gear, according to some embodiments of the present invention.

The transmission system may include a brake 600. In low gear, the second slidable gear 208 is locked with the transmission shaft 202 at the second position via the second locking unit 212, the first slidable gear 206 is neither aligned with nor meshed with the outer gear 308, and the brake 600 is applied to the outer gear 308 to prevent rotation of the outer gear 308.

Therefore, the second slidable gear 208 is meshed with the output gear 310 and transmits torque from the transmission shaft 202 to the sun gear sleeve 316. The rotation of the sun gear sleeve 316 causes the sun gear 312 (of FIGS. 2-5) to rotate. Because the outer gear 308 is prevented from rotating, the rotation of the sun gear 312 causes the rotation of the planetary gears 318 (of FIGS. 2-5) about centers thereof around the sun gear 312 (of FIGS. 2-5) and within the outer gear 308. As consequence of this rotation, the casing 320 rotates as well, and causes the output shaft 302 to rotate, either because the output shaft 302 is lockingly connected to the casing 320 (as shown in FIGS. 3a-3b) or because the casing 320 rotates the proximal gear 402 of the differential 400 (as seen in FIG. 6), and the proximal gear 402 is lockingly joined to the output shaft 302.

In this configuration, low gear is achieved, as the gear ratio is the lowest. The low gear configuration is used to start the rotation of the output shaft 302 from a state of no rotation and to maintain low rotational speed of the output shaft 302. In a non-limiting example, in low gear it takes three rotations of the sun gear 312 (and the output gear 310) to turn the planetary casing 320 one rotation against the outer gear 308. Therefore, the gear ratio is 1/3.

Figure 11:
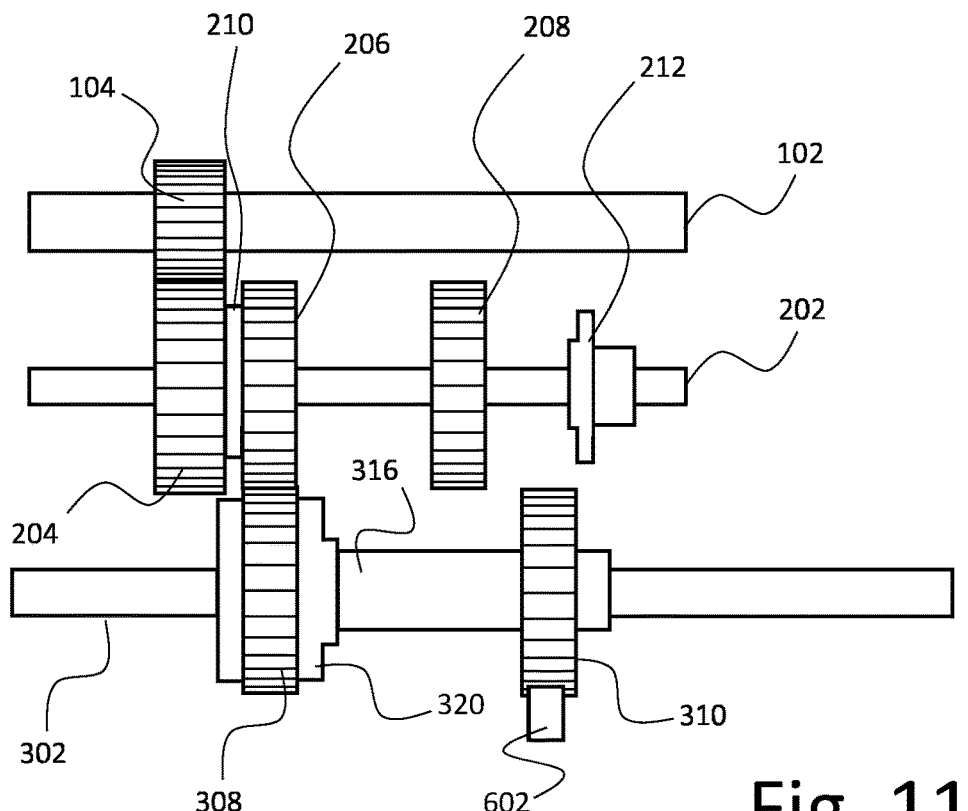
FIG. 11 illustrates the transmission system in an intermediate gear, according to some embodiments of the present invention.

FIG. 11 illustrates the transmission system in an intermediate gear, according to some embodiments of the present invention.

In the intermediate gear, the first slidable gear 206 is locked with the transmission shaft 202 at the first position and is meshed with the outer gear 308, the second slidable gear 208 is neither aligned no meshed with the output gear 310, and a brake 602 is applied to the output gear 310 to prevent rotation of the output gear 310, the sun gear sleeve 316, and the sun gear 312 (of FIGS. 2-5).

Therefore, the first slidable gear 206 is meshed with the outer gear 308 and transmits torque from the transmission shaft 202 to outer gear 308 and causes the outer gear 308 to rotate. Because the output gear 310 is prevented from rotating, the sun gear 312 does not rotate either. Therefore, the planetary gears 318 (of FIGS. 2-5) are rotated by the outer gear 308 about centers thereof and around the fixed sun gear 312 (of FIGS. 2-5). As consequence of this rotation, the casing 320 rotates as well, and causes the output shaft 302 to rotate, either because the output shaft 302 is lockingly connected to the casing 320 (as shown in FIGS. 3a-3b) or because the casing 320 rotates the proximal gear 402 of the differential 400 (as seen in FIG. 6), and the proximal gear 402 is lockingly joined to the output shaft 302.

In some embodiments of the present invention, the brake 602 is the same as the brake 600 of FIG. 11, and can be controlled to: selectively engage with the output gear 310, selectively engage with the outer gear 308, or to be disengaged from both the outer gear 308 and the output gear 310. In some embodiments of the present invention, two brake are included: the first brake 600 configured to selectively engage with the outer gear 308 (as shown in FIG. 10), and a second brake 602 configured to selectively engage with the output gear 310 (as shown in FIG. 10).

In this configuration, an intermediate gear is achieved, as the gear ratio is the higher than the gear ratio in low gear configuration. The intermediate gear configuration is used to increase the rotational speed of the output shaft 302 from the low gear configuration and to maintain intermediate rotational speed of the output shaft 302. In a non-limiting example, in the intermediate gear, one rotation of the outer gear 308 turns the planetary casing 2/3 of one rotation against the sun gear 312. Therefore, the gear ratio is 2/3.

Figure 12:
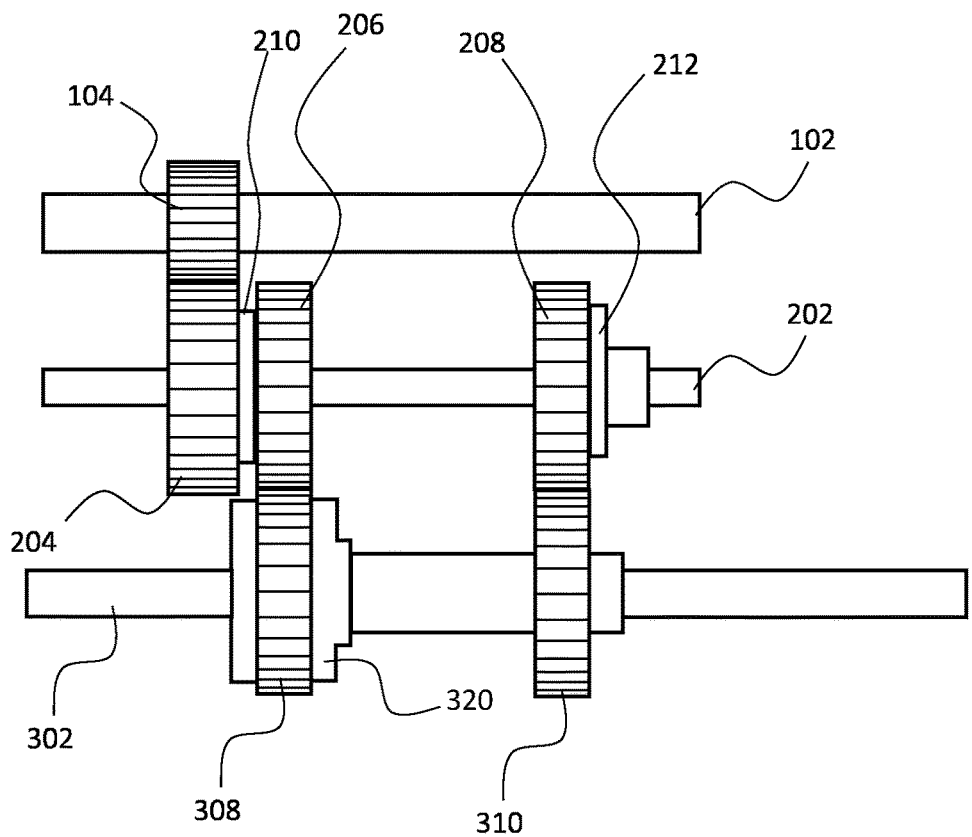
FIG. 12 illustrates the transmission system in a high gear, according to some embodiments of the present invention.

FIG. 12 illustrates the transmission system in a high gear, according to some embodiments of the present invention.

In high gear, the first slidable gear 206 is locked with the transmission shaft 202 at the first position by the first locking unit 210 and is meshed with the outer gear 206, while the second slidable gear 208 is locked with the transmission shaft 202 at the second position by the second locking unit 212 and is meshed with the output gear 310.

Therefore, the first slidable gear 206 is meshed with the outer gear 308 and transmits torque from the transmission shaft 202 to outer gear 308 and causes the outer gear 308 to rotate. The second slidable gear 208 is meshed with the output gear 310 and transmits torque from the transmission shaft 202 to the sun gear sleeve 316. The rotation of the sun gear sleeve 316 causes the sun gear 312 (of FIGS. 2-5) to rotate.

Therefore, both the sun gear 312 and the outer gear 308 rotate in the same direction, causing the planetary gears 318 to rotate around the sun gear 312 at a speed faster than that achieved in the low and intermediate gear configurations. As consequence of this rotation, the casing 320 rotates as well, and causes the output shaft 302 to rotate, either because the output shaft 302 is lockingly connected to the casing 320 (as shown in FIGS. 3a-3b) or because the casing 320 rotates the proximal gear 402 of the differential 400 (as seen in FIG. 6), and the proximal gear 402 is lockingly joined to the output shaft 302.

In the high gear configuration, both the sun gear 316 and the outer gear 308 rotate in the same direction. The gear ratio increases even further from the gear ration at intermediate gear configuration, and allows higher rotational speed of the outer shaft 302. In a non-limiting example, in high gear, the output gear 310 and the outer 308 gear are driven by the first and second slidable gears 208 and 210 of same circumference. Thus one rotation of the outer gear 308 and the sun gear 312 causes a full rotation of the planetary gears 318 around the sun gear 312 and produces a one-to-one gear ratio between the transmission shaft 202 and the output mechanism 300.

It should be noted that different circumferences of the gears and desired number of teeth of each gear can be chosen by a person skilled in the art in order to achieve desired results for the specific application in which the transmission system of the present invention is used.

Figure 13:
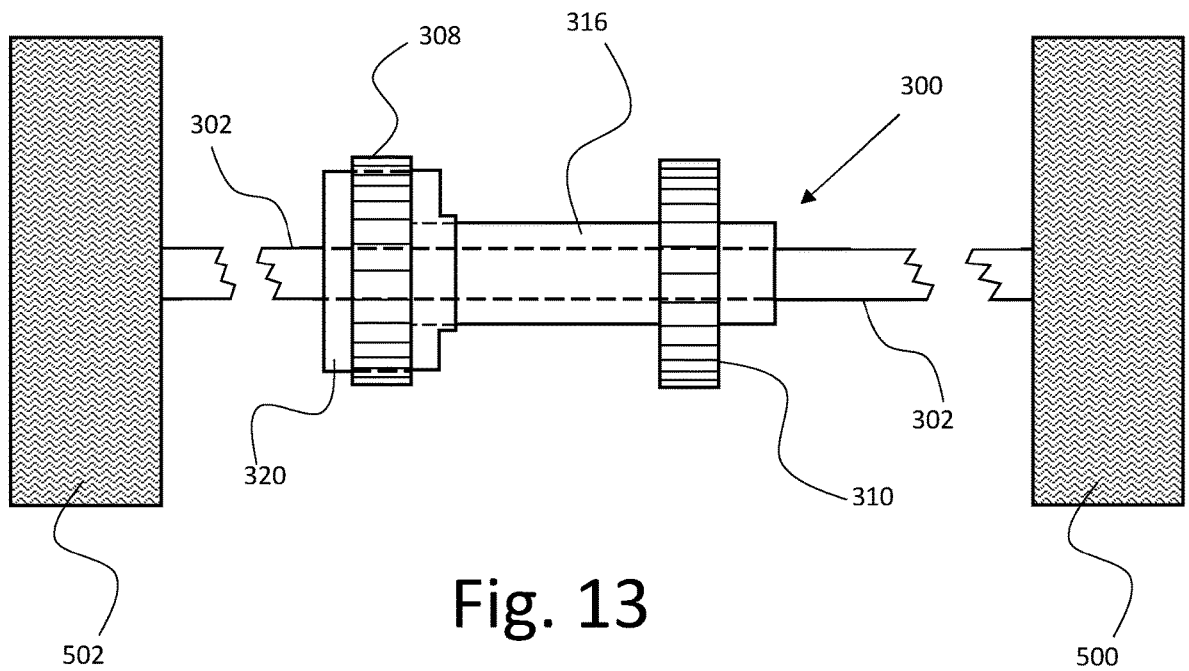
FIG. 13 illustrates the output mechanism of FIGS. 3a-3b used in a motor vehicle to power the motor vehicle, wherein the wheels of the motor vehicle are directly connected to the output shaft, according to some embodiments of the present invention.

FIG. 13 illustrates the output mechanism of FIGS. 3a-3b used in a motor vehicle to power the motor vehicle, wherein the wheels 500 and 502 of the motor vehicle are directly connected to the output shaft 302, according to some embodiments of the present invention.

In some embodiments of the present invention, the transmission system of the present patent application is used for powering a motor vehicle, and the output shaft 302 is used as the axle of the wheels 500 and 502.

Figure 14:
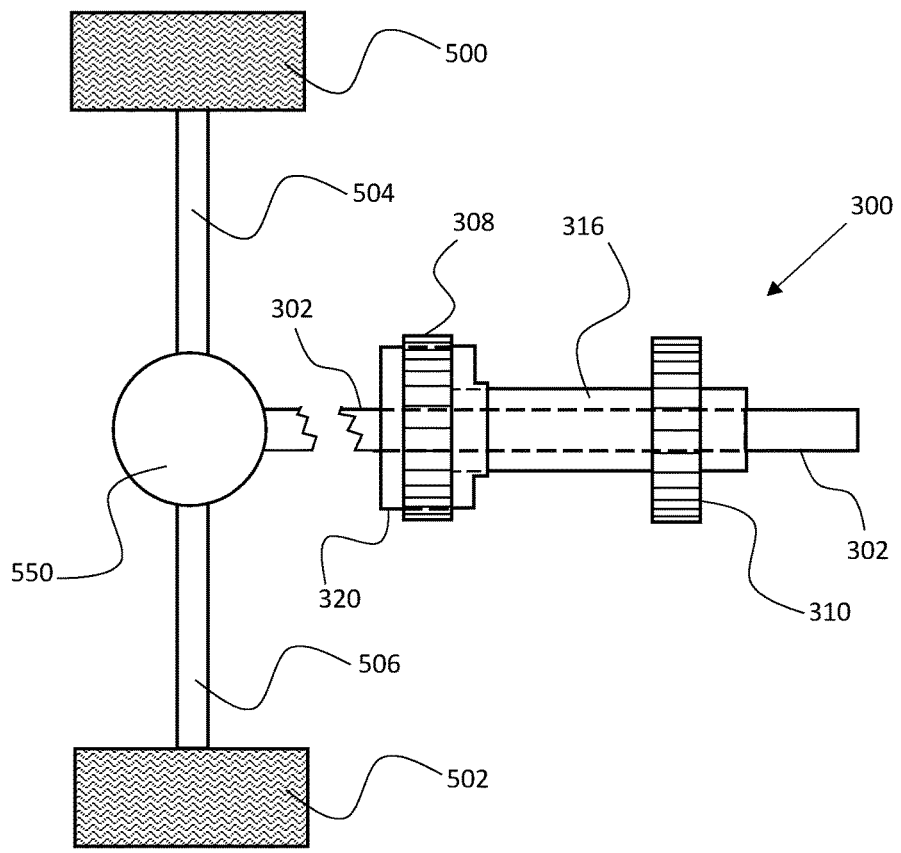
FIG. 14 illustrates the output mechanism of FIG. 3a-3b used in a motor vehicle to power the motor vehicle, wherein the output shaft is perpendicular the wheel axles of the motor vehicle, according to some embodiments of the present invention.

FIG. 14 illustrates the output mechanism of FIG. 3a-3b used in a motor vehicle to power the motor vehicle, wherein the output shaft 302 is at a non-zero angle with the wheel axles 504 and 506 of the motor vehicle, according to some embodiments of the present invention.

In the example of FIG. 14, a differential 550 (different from the differential 400 described above) known in the art, converts the rotation of the output shaft 302 to rotation of the axles 504 and 506 of wheels 500 and 502 (respectively), where the axles 504 and 506 are at an angle (for example, perpendicular) with the output shaft 302. The differential 550 may include any type of differential, and a person with ordinary skill in the art can select the type of differential best suited for the person's requirements.

It should be noted that examples of the transmission system of the present invention were directed at applications in the field of motor vehicles. However, the present invention can be used to transmit power in a variety of different fields in which torque is to be transmitted from a power source to an output device.

Figure 16:
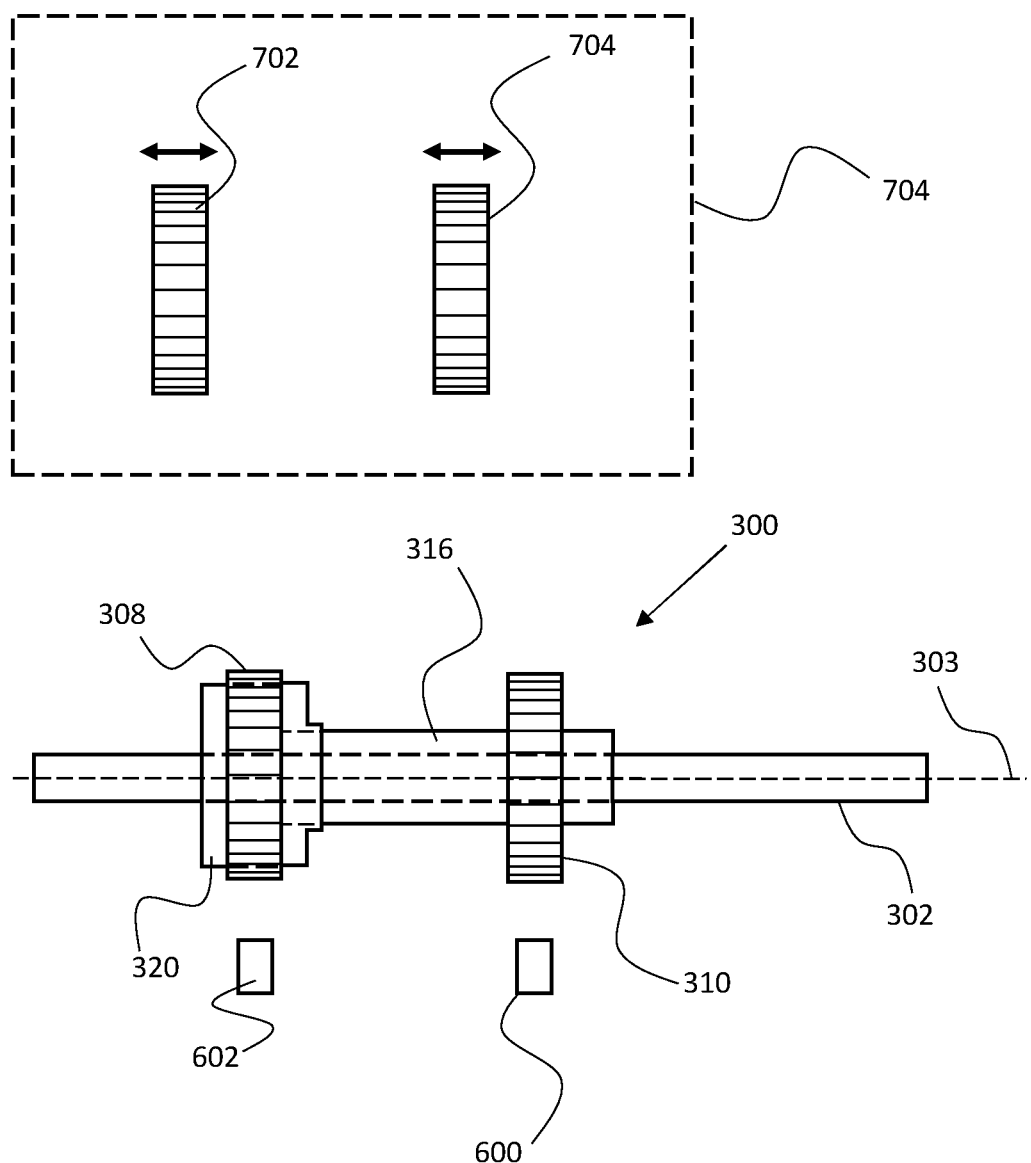
FIG. 16 illustrates an output mechanism configured to be used with an external powered mechanism, according to some embodiments of the present invention.

As shown in FIG. 16, an aspect of some embodiments of the present invention relates to the output mechanism 300 configured to be used with a powered external mechanism 700. The output mechanism is configured to be receive torque from the external mechanism 700, which may include the input mechanism 100 and the transmission mechanism 200 described above in FIGS. 1a-1b and 9-12, or may differ therefrom. The external mechanism 700 includes a first external gear 702 (akin to the first slidable gear 206 of FIGS. 1a-1b and 9-12) and a second external gear 704 (akin to the second slidable gear 208 of FIGS. 1a-1b and 9-12), both of which are directly or indirectly rotated by one motor or by respective independent motors. In the output mechanism 300, the outer gear 308 is configured to be selectively meshed with the first external gear 702, while the output gear 310 is configured to be selectively meshed with the second external gear 704. All the features of the output mechanism 300 are described above.

As explained above:
(a) neutral gear is achieved when the outer gear 308 and the first external gear 702 are not meshed and when the output gear 310 and the second external gear 704 are not meshed together;
(b) low gear is achieved when the outer gear 308 and the first external gear 702 are not meshed, a brake 600 is applied to the outer gear 308, and the output gear 310 and the second external gear 704 are meshed together so the output gear 308 is rotated by the second external gear 704;
(c) intermediate gear is achieved when the outer gear 308 and the first external gear 702 are meshed so that the outer gear 308 is rotated by the first external gear 202, the output gear 310 and the second external gear 704 are not meshed together, and a brake 602 is applied to the output gear 310;
(d) high gear is achieved when the outer gear 308 and the first external gear 702 are meshed so that the outer gear 308 is rotated by the first external gear 702, and the second external gear 704 and the output gear 310 are meshed together so the output gear 310 is rotated by the second external gear 704.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

What is claimed is:
1. A transmission system, comprising:
(a) an input mechanism, comprising:
 (a)(1) an input shaft configured to be joined to an engine and configured to be rotated by the engine about a central longitudinal axis of the input shaft; and
 (a)(2) an input gear disposed on the input shaft and rotating with the input shaft;
(b) a transmission mechanism comprising:
 (b)(1) a transmission shaft;
 (b)(2) a main transmission gear disposed on the transmission shaft and rotating with the transmission shaft, the main transmission gear being meshed with the input gear to transfer torque from the input shaft to the transmission shaft;
 (b)(3) a first slidable gear disposed on the transmission shaft, and configured to be slid along the transmission shaft and to rotate with the transmission shaft when located at a first position along the transmission shaft; and
 (b)(4) a second slidable gear disposed on the transmission shaft, and configured to be slid along the transmission shaft and to rotate with the transmission shaft when located at a second position along the transmission shaft; and
(c) an output mechanism, comprising:
 (c)(1) an output shaft parallel to the transmission shaft;
 (c)(2) a sun gear assembly comprising: (i) a sun gear traversed by the output shaft and concentric with the output shaft; (ii) a first bushing disposed between the sun gear and the output shaft and configured to enable relative rotation between the sun gear and the output shaft; and (iii) a sun gear sleeve extending from the sun gear and traversed by the output shaft, the sun gear sleeve rotating with the sun gear;
 (c)(3) a planetary gear assembly comprising: (i) one or more planetary gears disposed around an outer circumference of the sun gear and meshed with the sun gear; and (ii) a casing concentric to the sun gear, not touching the sun gear, and joined to centers of the one or more planetary gears, such that the casing is configured to rotate around the sun gear due to motion of the one or more planetary gears around the sun gear, the casing being mounted on the output shaft;

(c)(4) an outer gear concentric with the casing, the outer gear having inner teeth and outer teeth, the inner teeth being meshed with the one or more planetary gears and the outer teeth of the outer gear being configured to be meshed with the first slidable gear when the first slidable gear is at the first position, to receive torque from the transmission shaft when the first slidable gear is aligned with the outer gear;

(c)(5) an output gear disposed at a fixed position on the sun gear sleeve and lockingly joined to the sun gear sleeve to rotate with the sun gear sleeve, the output gear being configured to be meshed with the second slidable gear when the second slidable gear is at the second position, to receive torque from the transmission shaft when the second slidable gear is aligned with the output gear;

wherein a high gear is achieved, when:
the first slidable gear is meshed with the outer gear and transmits torque from the transmission shaft to the outer gear; and
the second slidable gear is meshed with the output gear and transmits torque from the transmission shaft to the sun gear sleeve via the output gear.

2. The transmission system of claim 1, wherein the first bushing extends longitudinally from the sun gear at least partially through the sun gear sleeve, to mount the sun gear sleeve onto the output shaft and to enable relative rotation between the sun gear sleeve and the output shaft.

3. The transmission system of claim 1, comprising a further bushing between the output shaft and at least a portion of the sun gear sleeve, to mount the sun gear sleeve onto the output shaft and to enable relative rotation between the sun gear sleeve and the output shaft.

4. The transmission system of claim 1, wherein:
the casing is locked with the output shaft, such that rotation of the casing causes rotation of the output shaft.

5. The transmission system of claim 1, wherein a neutral mode in which torque is not transmitted from the input shaft to the output shaft is achieved, when:
the first slidable gear is not aligned with the outer gear; and
the second slidable gear is not aligned with the output gear.

6. The transmission system of claim 1, comprising a brake and wherein a low gear is achieved, when:
the second slidable gear is meshed with the output gear and transmits torque from the transmission shaft to the sun gear sleeve via the output gear;
the first slidable gear is not meshed with the outer gear; and
the brake is applied to the outer gear to prevent rotation of the outer gear.

7. The transmission system of claim 1, comprising a brake and wherein an intermediate gear is achieved, when:
the first slidable gear is meshed with the outer gear and transmits torque from the transmission shaft to the outer gear;
the second slidable gear is not meshed with the output gear; and
the brake is applied to the output gear to prevent rotation of the sun gear sleeve and of the sun gear.

8. The transmission system of claim 1, wherein the one or more planetary gears comprise a plurality of planetary gears.

9. An output mechanism for use in a transmission system, the output gear comprising:
an output shaft;
a sun gear assembly comprising: (i) a sun gear traversed by the output shaft and concentric with the output shaft; (ii) a first bushing disposed between the sun gear and the output shaft and configured to enable relative rotation between the sun gear and the output shaft; and (iii) a sun gear sleeve extending from the sun gear and traversed by the output shaft, the sun gear sleeve rotating with the sun gear;
a planetary gear assembly comprising: (i) one or more planetary gears disposed around an outer circumference of the sun gear and meshed with the sun gear; and (ii) a casing concentric to the sun gear, not touching the sun gear, and joined to centers of the one or more planetary gears, such that the casing is configured to rotate around the sun gear due to motion of the one or more planetary gears around the sun gear, the casing being mounted on the output shaft;
an outer gear concentric with the casing, the outer gear having inner teeth and outer teeth, the inner teeth being meshed with the one or more planetary gears and the outer teeth of the outer gear being configured to be selectively meshed with a first external gear, to selectively receive torque from the first external gear;
an output gear disposed at a fixed position on the sun gear sleeve and lockingly joined to the sun gear sleeve to rotate with the sun gear sleeve, the output gear being configured to be selectively meshed with a second external gear, to selectively receive torque from the second external gear;
wherein a high gear is achieved, when:
the first external gear is meshed with the outer gear and transmits torque to the outer gear; and
the second external gear is meshed with the output gear and transmits torque to the sun gear sleeve via the output gear.

10. The output mechanism of claim 9, wherein the first bushing extends longitudinally from the sun gear at least partially through the sun gear sleeve, to mount the sun gear sleeve onto the output shaft and to enable relative rotation between the sun gear sleeve and the output shaft.

11. The output mechanism of claim 9, comprising a further bushing between the output shaft and at least a portion of the sun gear sleeve, to mount the sun gear sleeve onto the output shaft and to enable relative rotation between the sun gear sleeve and the output shaft.

12. The output mechanism of claim 9, wherein:
the casing is locked with the output shaft, such that rotation of the casing causes rotation of the output shaft.

13. The output mechanism of claim 9, wherein a neutral mode in which torque is not transmitted from the external gears to the output shaft is achieved, when:
the first external gear is not meshed with the outer gear; and
the second external gear is not meshed with the output gear.

14. The output mechanism of claim 9, comprising a brake and wherein a low gear is achieved, when:

the second external gear is meshed with the output gear and transmits torque to the sun gear sleeve via the output gear;

the first external gear is not meshed with the outer gear; and the brake is applied to the outer gear to prevent rotation of the outer gear.

15. The output mechanism of claim 9, comprising a brake and wherein an intermediate gear is achieved, when:

the first external gear is meshed with the outer gear and transmits torque to the outer gear;

the second external gear is not meshed with the output gear; and the brake is applied to the output gear to prevent rotation of the sun gear sleeve and of the sun gear.

16. An output mechanism for use in a transmission system, the output gear comprising:

an output shaft;

a sun gear assembly comprising: (i) a sun gear traversed by the output shaft and concentric with the output shaft; (ii) a first bushing disposed between the sun gear and the output shaft and configured to enable relative rotation between the sun gear and the output shaft; and (iii) a sun gear sleeve extending from the sun gear and traversed by the output shaft, the sun gear sleeve rotating with the sun gear;

a planetary gear assembly comprising: (i) one or more planetary gears disposed around an outer circumference of the sun gear and meshed with the sun gear; and (ii) a casing concentric to the sun gear, not touching the sun gear, and joined to centers of the one or more planetary gears, such that the casing is configured to rotate around the sun gear due to motion of the one or more planetary gears around the sun gear, the casing being mounted on the output shaft;

an outer gear concentric with the casing, the outer gear having inner teeth and outer teeth, the inner teeth being meshed with the one or more planetary gears and the outer teeth of the outer gear being configured to be selectively meshed with a first external gear, to selectively receive torque from the first external gear;

an output gear disposed at a fixed position on the sun gear sleeve and lockingly joined to the sun gear sleeve to rotate with the sun gear sleeve, the output gear being configured to be selectively meshed with a second external gear, to selectively receive torque from the second external gear;

a brake;

wherein a low gear is achieved, when:

the second external gear is meshed with the output gear and transmits torque to the sun gear sleeve via the output gear;

the first external gear is not meshed with the outer gear; and the brake is applied to the outer gear to prevent rotation of the outer gear.

17. An output mechanism for use in a transmission system, the output gear comprising:

an output shaft;

a sun gear assembly comprising: (i) a sun gear traversed by the output shaft and concentric with the output shaft; (ii) a first bushing disposed between the sun gear and the output shaft and configured to enable relative rotation between the sun gear and the output shaft; and (iii) a sun gear sleeve extending from the sun gear and traversed by the output shaft, the sun gear sleeve rotating with the sun gear;

a planetary gear assembly comprising: (i) one or more planetary gears disposed around an outer circumference of the sun gear and meshed with the sun gear; and (ii) a casing concentric to the sun gear, not touching the sun gear, and joined to centers of the one or more planetary gears, such that the casing is configured to rotate around the sun gear due to motion of the one or more planetary gears around the sun gear, the casing being mounted on the output shaft;

an outer gear concentric with the casing, the outer gear having inner teeth and outer teeth, the inner teeth being meshed with the one or more planetary gears and the outer teeth of the outer gear being configured to be selectively meshed with a first external gear, to selectively receive torque from the first external gear;

an output gear disposed at a fixed position on the sun gear sleeve and lockingly joined to the sun gear sleeve to rotate with the sun gear sleeve, the output gear being configured to be selectively meshed with a second external gear, to selectively receive torque from the second external gear;

a brake;

wherein an intermediate gear is achieved, when:

the first external gear is meshed with the outer gear and transmits torque to the outer gear;

the second external gear is not meshed with the output gear; and the brake is applied to the output gear to prevent rotation of the sun gear sleeve and of the sun gear.

18. A transmission system, comprising:

(a) an input mechanism, comprising:

(a)(1) an input shaft configured to be joined to an engine and configured to be rotated by the engine about a central longitudinal axis of the input shaft; and (a)(2) an input gear disposed on the input shaft and rotating with the input shaft;

(b) a transmission mechanism comprising:

(b)(1) a transmission shaft;

(b)(2) a main transmission gear disposed on the transmission shaft and rotating with the transmission shaft, the main transmission gear being meshed with the input gear to transfer torque from the input shaft to the transmission shaft;

(b)(3) a first slidable gear disposed on the transmission shaft, and configured to be slid along the transmission shaft and to rotate with the transmission shaft when located at a first position along the transmission shaft; and (b)(4) a second slidable gear disposed on the transmission shaft, and configured to be slid along the transmission shaft and to rotate with the transmission shaft when located at a second position along the transmission shaft;

and (c) an output mechanism, comprising:

(c)(1) an output shaft parallel to the transmission shaft;

(c)(2) a sun gear assembly comprising: (i) a sun gear traversed by the output shaft and concentric with the output shaft; (ii) a first bushing disposed between the sun gear and the output shaft and configured to enable relative rotation between the sun gear and the output shaft; and (iii) a sun gear sleeve extending from the sun gear and traversed by the output shaft, the sun gear sleeve rotating with the sun gear;

(c)(3) a planetary gear assembly comprising: (i) one or more planetary gears disposed around an outer circumference of the sun gear and meshed with the sun gear; and (ii) a casing concentric to the sun gear, not touching the sun gear, and joined to centers of the one or more planetary gears, such that the casing is configured to rotate around the sun gear due to motion of the one or more planetary gears around the sun gear, the casing being mounted on the output shaft;

(c)(4) an outer gear concentric with the casing, the outer gear having inner teeth and outer teeth, the inner teeth being meshed with the one or more planetary gears and the outer teeth of the outer gear being configured to be meshed with the first slidable gear when the first slidable gear is at the first position, to receive torque from the transmission shaft when the first slidable gear is aligned with the outer gear;

(c)(5) an output gear disposed at a fixed position on the sun gear sleeve and lockingly joined to the sun gear sleeve to rotate with the sun gear sleeve, the output gear being configured to be meshed with the second slidable gear when the second slidable gear is at the second position, to receive torque from the transmission shaft when the second slidable gear is aligned with the output gear;

(d) a first locking unit disposed on the transmission shaft and configured to lock the first slidable gear with the transmission shaft at the first position aligned with the outer gear, such that the first slidable gear rotates with the transmission shaft when located at the first position, in order to transmit torque from the transmission shaft to the outer gear;

(e) a second locking unit disposed on the transmission shaft and configured to lock the second slidable gear with the transmission shaft at the second position aligned with the output gear, such that the second slidable gear rotates with the transmission shaft when located at the second position, in order to transmit torque from the transmission shaft to the output gear.

19. A transmission system, comprising:
(a) an input mechanism, comprising:
  (a)(1) an input shaft configured to be joined to an engine and configured to be rotated by the engine about a central longitudinal axis of the input shaft; and
  (a)(2) an input gear disposed on the input shaft and rotating with the input shaft;
(b) a transmission mechanism comprising:
  (b)(1) a transmission shaft;
  (b)(2) a main transmission gear disposed on the transmission shaft and rotating with the transmission shaft, the main transmission gear being meshed with the input gear to transfer torque from the input shaft to the transmission shaft;
  (b)(3) a first slidable gear disposed on the transmission shaft, and configured to be slid along the transmission shaft and to rotate with the transmission shaft when located at a first position along the transmission shaft; and
  (b)(4) a second slidable gear disposed on the transmission shaft, and configured to be slid along the transmission shaft and to rotate with the transmission shaft when located at a second position along the transmission shaft;
and (c) an output mechanism, comprising:
  (c)(1) an output shaft parallel to the transmission shaft;
  (c)(2) a sun gear assembly comprising: (i) a sun gear traversed by the output shaft and concentric with the output shaft; (ii) a first bushing disposed between the sun gear and the output shaft and configured to enable relative rotation between the sun gear and the output shaft; and (iii) a sun gear sleeve extending from the sun gear and traversed by the output shaft, the sun gear sleeve rotating with the sun gear;
  (c)(3) a planetary gear assembly comprising: (i) one or more planetary gears disposed around an outer circumference of the sun gear and meshed with the sun gear; and (ii) a casing concentric to the sun gear, not touching the sun gear, and joined to centers of the one or more planetary gears, such that the casing is configured to rotate around the sun gear due to motion of the one or more planetary gears around the sun gear, the casing being mounted on the output shaft;
  (c)(4) an outer gear concentric with the casing, the outer gear having inner teeth and outer teeth, the inner teeth being meshed with the one or more planetary gears and the outer teeth of the outer gear being configured to be meshed with the first slidable gear when the first slidable gear is at the first position, to receive torque from the transmission shaft when the first slidable gear is aligned with the outer gear;
  (c)(5) an output gear disposed at a fixed position on the sun gear sleeve and lockingly joined to the sun gear sleeve to rotate with the sun gear sleeve, the output gear being configured to be meshed with the second slidable gear when the second slidable gear is at the second position, to receive torque from the transmission shaft when the second slidable gear is aligned with the output gear;
(d) a brake;
wherein a low gear is achieved, when:
  the second slidable gear is meshed with the output gear and transmits torque to the sun gear sleeve via the output gear;
  the first slidable gear is not meshed with the outer gear; and
  the brake is applied to the outer gear to prevent rotation of the outer gear.

20. A transmission system, comprising:
(a) an input mechanism, comprising:
  (a)(1) an input shaft configured to be joined to an engine and configured to be rotated by the engine about a central longitudinal axis of the input shaft; and
  (a)(2) an input gear disposed on the input shaft and rotating with the input shaft;
(b) a transmission mechanism comprising:
  (b)(1) a transmission shaft;
  (b)(2) a main transmission gear disposed on the transmission shaft and rotating with the transmission shaft, the main transmission gear being meshed with the input gear to transfer torque from the input shaft to the transmission shaft;
  (b)(3) a first slidable gear disposed on the transmission shaft, and configured to be slid along the transmission shaft and to rotate with the transmission shaft when located at a first position along the transmission shaft; and (b)(4) a second slidable gear disposed on the transmission shaft, and configured to be slid along the transmission shaft and to rotate with the transmission shaft when located at a second position along the transmission shaft;

(c) an output mechanism, comprising:

(c)(1) an output shaft parallel to the transmission shaft;

(c)(2) a sun gear assembly comprising: (i) a sun gear traversed by the output shaft and concentric with the output shaft; (ii) a first bushing disposed between the sun gear and the output shaft and configured to enable relative rotation between the sun gear and the output shaft; and (iii) a sun gear sleeve extending from the sun gear and traversed by the output shaft, the sun gear sleeve rotating with the sun gear;

(c)(3) a planetary gear assembly comprising: (i) one or more planetary gears disposed around an outer circumference of the sun gear and meshed with the sun gear; and (ii) a casing concentric to the sun gear, not touching the sun gear, and joined to centers of the one or more planetary gears, such that the casing is configured to rotate around the sun gear due to motion of the one or more planetary gears around the sun gear, the casing being mounted on the output shaft;

(c)(4) an outer gear concentric with the casing, the outer gear having inner teeth and outer teeth, the inner teeth being meshed with the one or more planetary gears and the outer teeth of the outer gear being configured to be meshed with the first slidable gear when the first slidable gear is at the first position, to receive torque from the transmission shaft when the first slidable gear is aligned with the outer gear;

(c)(5) an output gear disposed at a fixed position on the sun gear sleeve and lockingly joined to the sun gear sleeve to rotate with the sun gear sleeve, the output gear being configured to be meshed with the second slidable gear when the second slidable gear is at the second position, to receive torque from the transmission shaft when the second slidable gear is aligned with the output gear;

(d) a brake;

wherein an intermediate gear is achieved, when:

the first slidable gear is meshed with the outer gear and transmits torque from the transmission shaft to the outer gear;

the second slidable gear is not meshed with the output gear; and the brake is applied to the output gear to prevent rotation of the sun gear sleeve and of the sun gear.

* * * * *